(12) United States Patent
Sandoval et al.

(10) Patent No.: US 10,889,721 B2
(45) Date of Patent: Jan. 12, 2021

(54) WATER-BASED COMPOSITIONS WITH LONG TERM GLOSS RETENTION

(71) Applicant: SWIMC LLC, Cleveland, OH (US)

(72) Inventors: Robert W. Sandoval, Crystal Lake, IL (US); Matthew D. Andersson, Elgin, IL (US); T. Howard Killilea, North Oaks, MN (US); Mary Jane Hibben, Elburn, IL (US); Frank Cusimano, Marengo, IL (US); Tyler Bell, Naples, FL (US); Michael C. Wildman, Hoffman Estates, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/425,574

(22) Filed: May 29, 2019

(65) Prior Publication Data

US 2019/0367740 A1    Dec. 5, 2019

Related U.S. Application Data

(60) Provisional application No. 62/677,399, filed on May 29, 2018.

(51) Int. Cl.
*C08L 21/02* (2006.01)
*C09D 7/48* (2018.01)
(Continued)

(52) U.S. Cl.
CPC .............. *C09D 4/06* (2013.01); *C08F 12/08* (2013.01); *C08F 18/08* (2013.01); *C08F 20/06* (2013.01);
(Continued)

(58) Field of Classification Search
None
See application file for complete search history.

(56) References Cited

U.S. PATENT DOCUMENTS 4,064,286 A  12/1977  Hahn
4,314,933 A   2/1982  Berner
(Continued)

FOREIGN PATENT DOCUMENTS

CN       105315819       2/2016
WO       WO010027487    3/2010
(Continued)

OTHER PUBLICATIONS

Koleske et al., "Additives Guide", Paint & Coating Industry. Apr. 2003. pp. 12-86. www.pcimag.com.
(Continued)

*Primary Examiner* — Colin W. Slifka
(74) *Attorney, Agent, or Firm* — Mueting Raasch Group

(57) ABSTRACT

Water-based coating compositions or paint having improved gloss retention, including a latex or water-dispersible polymer, a UV-VIS absorber comprising a substituted benzophenone capable of being a free radical generator, a hindered amine light stabilizer, and optionally a low-VOC coalescent provided in a preferably desired amount. A composition comprising a blend a UV-VIS absorber comprising a substituted benzophenone capable of being a free radical generator, a hindered amine light stabilizer, and a low-VOC coalescent, providing a thermally-stable coalescent that can be used in a paint formulation for gloss retention. Gloss retention of paints containing the UV-VIS absorber and hindered amine light stabilizer being markedly improved over paints that do not have both components present.

20 Claims, 2 Drawing Sheets

(51) Int. Cl.

| | | |
|---|---|---|
| *C09D 4/06* | (2006.01) | |
| *C08F 12/08* | (2006.01) | |
| *C08F 18/08* | (2006.01) | |
| *C08F 20/06* | (2006.01) | |
| *C08F 20/18* | (2006.01) | |
| *C08K 5/132* | (2006.01) | |
| *C08K 5/357* | (2006.01) | |
| *C08K 5/3435* | (2006.01) | |

(52) U.S. Cl.
CPC ........... *C08F 20/18* (2013.01); *C09D 7/48* (2018.01); *C08K 5/132* (2013.01); *C08K 5/3435* (2013.01); *C08K 5/357* (2013.01); *C08L 21/02* (2013.01)

(56) References Cited

U.S. PATENT DOCUMENTS

| | | |
|---|---|---|
| 4,344,876 A | 8/1982 | Berner |
| 4,426,471 A | 1/1984 | Berner |
| 4,654,398 A | 3/1987 | McFadden |
| 4,657,832 A * | 4/1987 | Pfeifer ............... C08G 73/1046 430/18 |
| 5,106,891 A | 4/1992 | Valet |
| 5,609,963 A | 3/1997 | Cai et al. |
| 5,705,545 A * | 1/1998 | Avar ................... C07D 211/46 524/102 |
| 5,824,716 A | 10/1998 | Coqueret et al. |
| 5,863,998 A | 1/1999 | Cai |
| 6,372,340 B1 | 4/2002 | Tominaga et al. |
| 6,488,760 B1 | 12/2002 | Binns et al. |
| 6,762,230 B2 | 7/2004 | Owens et al. |
| 6,843,939 B2 | 1/2005 | Stretanski et al. |
| 6,930,141 B2 | 8/2005 | Gebhart et al. |
| 7,659,340 B2 | 2/2010 | Coward et al. |
| 7,812,079 B2 | 10/2010 | Brandenburger et al. |
| 7,923,503 B2 | 4/2011 | Takahashi et al. |
| 7,923,513 B2 | 4/2011 | Killiliea et al. |
| 8,106,239 B2 | 1/2012 | Zhou et al. |
| 8,110,624 B2 | 2/2012 | Brandenburger et al. |
| 8,440,752 B2 | 5/2013 | Brandenburger et al. |
| 9,120,936 B2 * | 9/2015 | Hibben ............... C09D 5/024 |
| 9,611,393 B2 | 4/2017 | Hibben et al. |
| 9,822,275 B2 * | 11/2017 | Hibben ............... C09D 5/16 |
| 10,221,332 B2 | 3/2019 | Niimoto |
| 2004/0192684 A1 * | 9/2004 | Ravichandran ...... C07D 405/04 514/230.5 |
| 2007/0100074 A1 | 5/2007 | Devonport et al. |
| 2007/0110981 A1 | 5/2007 | Killilea et al. |
| 2008/0200631 A1 * | 8/2008 | Haring ............... C12P 7/625 526/319 |
| 2009/0149591 A1 | 6/2009 | Yang et al. |
| 2010/0178494 A1 | 7/2010 | Foster et al. |
| 2011/0245390 A1 | 10/2011 | Yang et al. |
| 2016/0053127 A1 * | 2/2016 | Hibben ............... C09D 5/16 524/292 |
| 2016/0145460 A1 | 5/2016 | Bell et al. |
| 2017/0073543 A1 | 3/2017 | Joecken et al. |
| 2017/0226373 A1 * | 8/2017 | Reno ............... C09D 167/02 |
| 2017/0247565 A1 | 8/2017 | Bell et al. |
| 2017/0335127 A1 | 11/2017 | Ewert et al. |
| 2018/0016376 A1 | 1/2018 | Belowich et al. |

FOREIGN PATENT DOCUMENTS

| | | | |
|---|---|---|---|
| WO | WO-2016069410 A1 * | 5/2016 | ........... C09D 167/02 |
| WO | WO2018/032410 | 2/2018 | |

OTHER PUBLICATIONS

International Search Report and Written Opinion for PCT/US2019/034398 dated Sep. 16, 2019.
Lin, "Novel Light Stabilizers for Waterborne and Epoxy Coatings", Dec. 31, 2013. Everlight Chemical Industrial Corporation.
Polymer Properties Database, "Hindered Amine Light Stabilizers (HALS)", https://polymerdatabase.com/polymer4AI20chemistry!HALS.html (© 2015).

* cited by examiner

WATER-BASED COMPOSITIONS WITH LONG TERM GLOSS RETENTION

CROSS-REFERENCE TO RELATED APPLICATION

This application claims the benefit of U.S. Provisional Application No. 62/677,399 filed May 29, 2018, the disclosure of which is incorporated herein by reference in its entirety.

TECHNICAL FIELD

The present invention relates to aqueous coating compositions containing one or more latex polymers or water-dispersible polymers with improved gloss retention, particularly water-based paints.

BACKGROUND

A water-based composition with low volatile organic (VOC) content such as a paint, seal, coat, caulk, etc. is exposed to the surrounding environment from the moment the composition is first applied and is exposed to the effects of the sun, rain, wind currents, direct physical contact with people, animals, or objects, and the like. Over time, surfaces or substrates painted with such water-based compositions, particularly high gloss paints including acrylic polymer systems, will lose gloss and acquire a dirty or dull appearance when exposed to the surrounding environment. Such substrates and surfaces require frequent repainting, leading to increased cost and effort.

Commercially available coating compositions, particularly self-crosslinking acrylic polymer systems have poor gloss retention, with up to 70% of gloss lost over the first 2000 hours of exposure to the atmosphere. The paint industry has traditionally used a small amount (typically less than 1.0%) of benzophenone to aid in improving certain physical properties and performance characteristics of water-based paints, specifically water-based acrylic paints. But even paints with benzophenone lose a significant amount of gloss over 1 to 2 years of exterior exposure. There is also a general desire in the industry to reduce VOC emissions to at or near-zero levels, thereby reducing the environmental and health impact of paints. In some newer ASTM methods, benzophenone is classified as a VOC, and its use as a paint additive in water-based paints increases the VOC emissions of the paint. Benzophenone may also leach over time.

Accordingly, there is a need for compositions and paints that have improved gloss retention over an extended period of time without compromising the required application and performance properties desirable for finished surfaces in the paint industry, including scrub resistance, block resistance, hardness and dirt pick-up resistance, and without the disadvantages of benzophenone.

SUMMARY

The present invention provides water-based paint or coating compositions that include at least one latex polymer or water-dispersible polymer, one or more UV-VIS absorbers comprising a substituted benzophenone capable of being a free radical generator, one or more hindered amine light stabilizers, and optionally one or more low-VOC coalescents. In some aspects, the one or more UV-VIS absorbers and the one or more hindered amine light stabilizers are present in a total combined weight of at least 0.5 wt-% based upon the total resin solids in the paint or coating composition.

In some aspects, the water-based paint or coating compositions are prepared by combining the aqueous polymer with the one or more UV-VIS absorbers (preferably, ultraviolet) and the one or more hindered amine light stabilizers at the end of a polymerization reaction while the polymer is still at a high temperature.

In some aspects, the water-based paint or coating compositions include a thermally-stable coalescent blend composition that includes the one or more UV-VIS absorbers comprising a substituted benzophenone capable of being a free radical generator, the one or more hindered amine light stabilizers, and one or more low-VOC coalescents.

In some aspects, the thermally-stable coalescent blend composition is prepared by combining at a temperature above about 60° C. to about 100° C. the one or more UV-VIS absorbers comprising a substituted benzophenone capable of being a free radical generator, the one or more hindered amine light stabilizers, and the one or more low-VOC coalescents, to form a blend, and then reducing the temperature of the blend to ambient temperature (e.g., 20-25° C.) or below. In some aspects, the one or more UV-VIS absorbers and the one or more hindered amine light stabilizers are present in a weight ratio of about 1:9 to about 7:3 (UV-VIS absorbers:hindered amine light stabilizers) based upon weight percentage.

In some aspects, the water-based paint or coating compositions are prepared by combining the aqueous polymer with the thermally-stable coalescent blend composition. Accordingly, in some aspects, the present invention provides water-based paints having a polymer, such as one or more latex or water-dispersed polymers, and adding the thermally-stable coalescent blend composition to the base paint for improving gloss retention. In some other aspects, the present invention provides a method of making a paint formulation of a desired color by adding a colorant composition and/or the thermally-stable coalescent blend to the base paint formulation at a point-of-sale.

In some aspects, the one or more UV-VIS absorbers are present in the paint or coating compositions in amount of at least 0.2 wt-% based upon the total resin solids. In some other aspects, the one or more UV-VIS absorbers are present in the paint or coating compositions in amount of at least 0.65 wt-% based upon the total resin solids. In some other aspects, the one or more UV-VIS absorbers are present in the paint or coating compositions in amount of at least 0.95 wt-% based upon the total resin solids. In some aspects, the UV-VIS absorbers are water-insoluble.

In some aspects, the one or more hindered amine light stabilizers are present in the coating composition in an amount of at least 0.5 wt-% based upon the total resin solids. In some other aspects, the one or more hindered amine light stabilizers are present in the coating composition in an amount of at least 1.5 wt-% based upon the total resin solids. In some other aspects, the one or more hindered amine light stabilizers are present in the coating composition in an amount of at least 1.9 wt-% based upon the total resin solids.

In some aspects, the one or more water-insoluble UV-VIS absorbers and the one or more hindered amine light stabilizers are present in a ratio about 1:3 to about 7:3 (UV-VIS absorbers:hindered amine light stabilizers) based upon weight percentage.

In some aspects, the paint or coating compositions include less than about 50 g/L of and even down to VOC, in some aspects less than about 45 g/L of VOC, in some aspects less than about 40 g/L of VOC, in some aspects less than about 35 g/L of VOC, in some aspects less than about 30 g/L of VOC, in some aspects less than about 25 g/L of VOC, in some aspects less than about 20 g/L of VOC, in some aspects less than about 15 g/L of VOC, in some aspects less than about 10 g/L of VOC, in some other aspects less than about 5 g/L of VOC, most preferably less than about 1 g/L of VOC.

In some aspects, the coating composition when used in paint (e.g., architectural paint), such as a semi-glossy or glossy finish paint for example applied to a substrate and allowed to dry as a film has at least 80% gloss retention, in some aspects at least 85% gloss retention, in some aspects at least 90% gloss retention, in some aspects at least 95% gloss retention, in some aspects at least 97% gloss retention, in some aspects at least 98% gloss retention, in some aspects at least 99% gloss retention, and in some aspects at least 100% gloss retention, the gloss retention being after at least 2000 hours measured by QUVA gloss retention at 60-degree gloss according to ASTM G154, using Cycle 1 as listed in the standard.

In some aspects, the coating composition when used in paint (e.g., architectural paint) and allowed to dry on a substrate as a dried film has an initial minimum gloss rating of at least 20 (satin-like), at least 35 (traditional semi-gloss), at least 70 (traditional gloss/high gloss architectural), at least 85 (high gloss) units with a 60-degree gloss meter, and the dried film has a gloss retention of at least 90% over 2000 hours as measured at 60-degree gloss. In some aspects, the dried film applied to a substrate has a gloss retention of less than a 10 unit drop over 2000 hours measured at 60-degree gloss according to ASTM G154, using Cycle 1 as listed in the standard.

In some aspects, the coating composition when used in paint (e.g., architectural paint) and allowed to dry on a substrate as a dried film has an improved dirt pick-up resistance by at least 10%, or at least 20%, or at least 30%, or at least 40%, or at least 50%, or at least 60%, or at least 70%, or at least 80%, or at least 90%, relative to the same water-based composition without the ultraviolet absorber and HALS, based on a change in ΔE values.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

SELECTED DEFINITIONS

Figure 1:
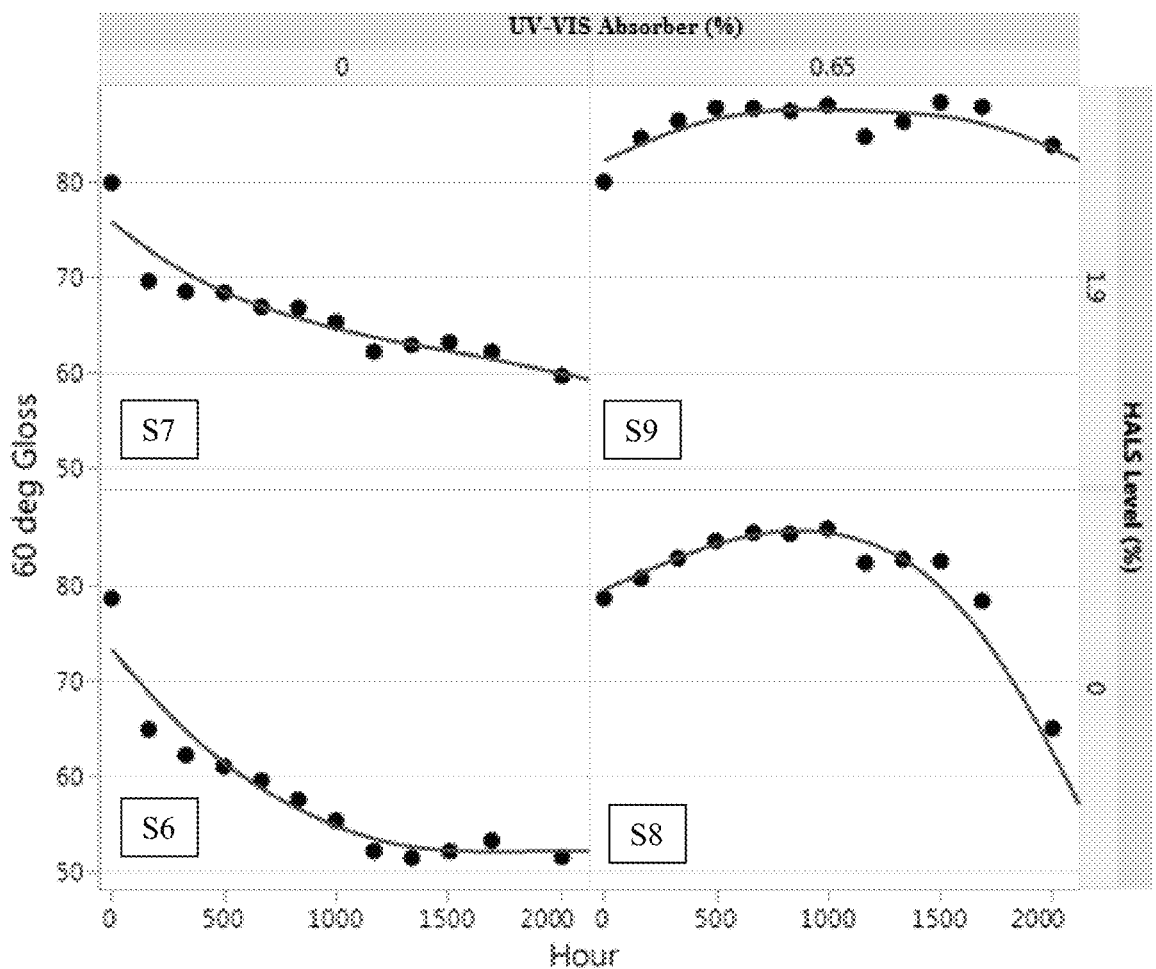
FIG. 1 is a graph illustrating the synergistic effect on measured gloss retention over time of a coating composition having a UV-VIS absorber and hindered amine light stabilizers.

Unless the context indicates otherwise the following terms shall have the following meaning and shall be applicable to the singular and plural:

The terms "a," "an," "the," "at least one," and "one or more" are used interchangeably. Thus, for example, a system or method that includes "a" polymer means that the system or method may include "one or more" polymers.

The term "architectural paint" refer to a paint for use on the interior or exterior of a building or construction surfaces, e.g., walls, trim, floors, decks, railings, ceilings, roofs (including metal roofing, shingles and tiles), etc.

The term "base paint" means a water-borne paint product packaged in a largely but incompletely filled point-of-sale container with a volume of about 0.2 to 20 L (e.g., approximately 1-quart can, 1-gallon can or 5-gallon bucket volumes) equipped with an openable and recloseable lid, cap or other closure, and which may be used as is but normally will be tinted at the point-of-sale outlet by adding one or more colorants to the paint product in its container, and stirring, shaking or otherwise mixing the container contents to disperse the colorant throughout the base paint product. The base paints described herein are "in-store tintable," referring to base paints that are present in containers (such as paint cans, for example) and can be tinted or colored by adding a colorant composition in the store, viz. at a point of sale outlet, to provide a paint formulation of a desired color and finish.

The term "colorant" refers to a composition that can be added to (e.g., dispensed into) a point-of sale container whose interior volume is largely (e.g., two thirds of the container volume or more) but not completely already filled with a base paint so as to alter the hue or lightness of such base paint, and which contains pigment or dye and an optional vehicle but is substantially free of binder.

The term "component" refers to any ingredient or portion thereof that includes a particular feature or structure. Examples of components include compounds, monomers, oligomers, polymers, and organic groups contained therein.

The term "comprises" and variations thereof do not have a limiting meaning where these terms appear in the description and claims. Thus, a composition comprising an ethylenically unsaturated compound means that the composition includes one or more ethylenically unsaturated compounds.

As used herein, the term "container" refers to any vessel (either with or without a lid or other type of closure) used to store, mix, tint or color a paint formulation, and includes the vessels in which paints are typically marketed and sold. Suitable containers include paint cans, paint bottles, containers made of metal, containers made of plastic or other polymeric materials, and the like.

The term "dirt pick-up resistance" as used herein, in the context of coating composition used as a paint refers to the difference ΔE of a dried paint film that is clean of dirt compared to the paint that is exposed to dirt as measured by a spectrometer. The improvement in dirt pick-up resistance can be expressed as a percentage by taking the difference in ΔE divided by the ΔE of the control paint.

The term "dispersion," as used herein, in the context of a dispersible polymer refers to the mixture of a dispersible polymer and a carrier. Unless otherwise indicated, the term "dispersion" is intended to include the term "solution."

The term "double bond" is non-limiting and refers to any type of double bond between any suitable atoms (e.g., C, O, N, etc.). The term "ethylenically unsaturated" refers to a carbon-carbon double or triple bond capable of participating in a free-radical initiated polymerization reaction, and is not intended to encompass the carbon-carbon double bonds present in aryl groups such as, for example, the phenyl group of styrene. Thus, for example, dodecyl benzene sulfonic acid is not considered to include an ethylenically unsaturated group.

The term "finish," as used herein, refers to the texture or appearance of a paint when applied and dried on to a substrate, typically an architectural surface such as an interior wall, for example. The term may also be used to refer to the paint used to produce such texture or appearance when applied to an architectural surface. Paints are typically found in a variety of finishes such as, for example, flat or matte, eggshell, satin, semigloss and glossy finishes. The finish of a particular paint is a function, among other things, of the pigment-to-binder (P-to-B) ratio of the paint or composition, wherein the higher the P-to-B ratio, typically the less reflective the paint. For example, a flat paint typically has a high P-to-B ratio and dries to a non-reflective or minimally reflective appearance when applied to an architectural surface, whereas a glossy finish typically has a lower P-to-B ratio and dries to a reflective appearance when applied to an architectural surface.

Unless otherwise indicated, the glass transition temperature or "Tg" values described herein are theoretical values predicted using the Fox equation. Application of the Fox equation to estimate the Tg of polymers is well known in the art.

The term "gloss" as used herein refers to the specular reflectance from a planar surface. Gloss is determined by projecting a beam of light of fixed intensity and angle onto a surface and measuring the amount of reflected light at an equal but opposite angle. As used herein, gloss is measured at angles 60° using the procedure detailed in ASTM D523-14 (Standard Test Method for Specular Gloss). "Gloss retention," as used herein, refers to a coating's ability to maintain its gloss. It is a measure of coating durability according to the accelerated weather protocol ASTM G154, using Cycle 1 as listed in the standard, which uses a lamp (UVA-340) having an irradiance of 0.89 $W/m^2/nm$ at an approximate wavelength of 340 nm at an exposure cycle of 8 hours of UV at 60° C. and 4 hours condensation at 50° C.

The term "headspace," as used herein, refers to the volume remaining in a container after the container has been filled with a base paint.

The term "low-VOC coalescent" refers to a coalescent that elutes from a gas chromatography column at the same time as methyl palmitate or after methyl palmitate using the standard chromatography conditions specified in ASTM D6886-12.

The term "multistage," as used herein with respect to a latex polymer, refers to the latex polymer being made using discrete, sequential charges of two or more monomers or monomer mixtures, or using a continuously-varied charge of two or more monomers, or a combination thereof. The phrase "multistage latex polymer" is used broadly herein and is not intended to require that the two or more stages of the multistage latex form a single continuous molecule within a given latex particle. Accordingly, the phrases "multistage latex" and "multistage latex polymer" are used interchangeably herein. Usually a multistage latex will not exhibit a single Tg inflection point as measured by differential scanning calorimetry (DSC). For example, a DSC curve for a multistage latex made using discrete charges of two or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The term "on", when used in the context of a coating applied on a surface or substrate, includes coatings applied directly or indirectly to the surface or substrate. Thus for example, a coating applied to a primer layer overlying a substrate constitutes a coating applied on the substrate.

The term "paint" refers to a coating composition including pigment and film-forming binder which when applied to form a thin (e.g., approximately 100 μm) wet thickness coating film on a freshly-sanded smooth wood surface will, when dried, hide or substantially hide the wood grain and will present a new surface with its own appearance.

The term "pigment" includes both organic and inorganic colored, dispersible solid particulate materials and colored dispersible or soluble dye materials, wherein the material imparts visually noticeable color to a base paint when 5 weight percent ("wt. %") (in the case of a colored, dispersible solid particulate) or 0.05 wt. % (in the case of a colored, dispersible or soluble dye) of the material is added to (e.g., dispensed into) the base paint. The presence or absence of visually noticeable color may be assessed by preparing drawdown samples of the base paint with and without the pigment, casting such samples as 25 μm dry thickness coated films over the white part of a BYK-Gardner No. PA-2811 opacity drawdown chart (from BYK-Gardner USA) or comparable chart, and examining the coated films under normal overhead interior illumination.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "polymer" includes both homopolymers and copolymers (viz., polymers of two or more different monomers).

The terms "pigment volume concentration" or "PVC" when used with respect to a paint or other coating compositions mean the total percentage of dried solids volume, including extender pigments and opaque polymers, occupied by a recited pigment species (or if no pigment species is recited, then by all pigment species) in such dried solids.

The term "stable" in the context of a water-based composition containing a dispersible coalescent means that the coalescent does not phase separate from the water-based composition upon standing at 120° F. (49° C.) for at least four weeks.

The term "substantially free," when applied to components of a composition and not to VOC levels, refers to compositions of the present invention containing no more than about 5 wt. % of a particular component, based on total weight of solids in the composition. For example, a composition of the present invention that is substantially free of coalescent contains no more than about 5 wt. % coalescent, based on total weight of solids in the composition. A composition of the present invention that is essentially free of a coalescent component, for example, contains no more than about 0.5 wt. % of the coalescent compound, based on total weight of solids in the composition. When applied to VOC levels, the term "substantially free," refers to compositions of the present invention that contain less than about 50 g/L VOCs. Unless otherwise indicated, the terms "low-VOC" and "substantially free of VOC" are used interchangeably herein. The term "essentially free of VOC" refers to compositions of the present invention that contain less than 5 g/L of VOCs. The terms, "zero VOC" and "essentially free of VOC" are used interchangeably herein.

The term "substituted benzophenone" in the context of one or more UV-VIS absorbers is not intended to imply that the UV-absorber is necessarily derived from benzophenone as an ingredient.

The term "thermally-stable coalescent blend" refers to a liquid solution of one or more UV-VIS absorbers capable of absorbing radiation within a range of 240-465 nm, one or more hindered amine light stabilizers, and one or more low-VOC coalescents, such that less than 1 wt-% of the UV-VIS absorber, if any, precipitates out of solution when stored for at least 30 days at −20° C.

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in atmospheric photochemical reactions as defined in the code. Typically, volatile organic compounds have a vapor pressure equal to or greater than 0.1 mm Hg. As used herein, "volatile organic compound content" ("VOC content") is as measured by ASTM method D2369-90, refers to the weight of VOC per volume of the coating solids, and is reported, for example, as grams VOC per liter (g/L).

As used herein, the term "washability" refers to the relative ease of removing dirt, soil, discolorations, and the like, from the a dried film of a coating applied to a substrate surface, typically an interior architectural surface such as a wall, for example. The soil or dirt is typically removed by washing with abrasive or non-abrasive cleaning compositions. ASTM D3450-00 (Standard Test Method for Washability Properties of Interior Architectural Coatings) may be used to measure washability. The terms "washability" and "stain resistance" are used interchangeably herein. Washability may be assigned a washability rating on a scale from 0 to 10, where a rating of 0 corresponds to very poor stain removal, and a rating of 10 corresponds to complete stain removal.

The term "water-dispersible" in the context of a polymer refers to a polymer that can be mixed into water (or an aqueous carrier) to form a stable mixture. For example, a mixture that readily separates into immiscible layers is not a stable mixture. Unless otherwise indicated, the term "water-dispersible" is intended to include the term "water-soluble." In other words, by definition, a water-soluble polymer is also considered to be a water-dispersible polymer.

Unless otherwise indicated, a reference to a "(meth) acrylate" compound (where "meth" is in parentheses or bracketed) is meant to include both acrylate and methacrylate compounds.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a of a series of endpoints includes disclosure of not only that range but also all subranges subsumed using such endpoints and also within that range (e.g., 1 to 5 includes 1 to 4, 2 to 3.80, 1.5 to 5, etc.).

DETAILED DESCRIPTION

In preferred embodiments, the present disclosure provides water-based compositions, such as coating compositions, particularly paints, containing a polymer comprising a latex or water-dispersible polymer, one or more UV-VIS absorbers preferably capable of absorbing radiation within a range of 240-465 nm and preferably comprising a substituted benzophenone capable of being a free radical generator, one or more hindered amine light stabilizers, and optionally one or more low-VOC coalescents. Preferably, the water-based compositions are in the form of paints, although pigmented or unpigmented sealers, and sealants are within the scope of the present disclosure.

The inventors of the present invention having surprisingly discovered that the water-based compositions of the present disclosure have an enhanced long term gloss retention and a relatively low volatile organic content without sacrificing the balance of properties desired for an applied (i.e., dry) composition, such as a coating of paint. Governments have established regulations setting forth guidelines relating to volatile organic compounds (VOC) that may be released into the atmosphere. Such regulations vary from region to region, but the most stringent regulations are in the south coast region (e.g., Los Angeles County and Orange County, Calif.). Such regulations also vary by product. For example, clear topcoats can have no more than 200 grams per liter (g/l), water-borne coatings can have no more than 50 g/l, and pigmented lacquers can have no more than 275 g/l VOC.

Reducing the volatility of coalescents, solvents, plasticizers, photoinitiators, etc. can adversely affect the balance of properties needed in water-based compositions, especially with respect to gloss retention and/or dirt pick-up. Thus, there is a need for compositions that possess desirable stability, compatibility, film formation ability, long term gloss retention, low dirt pick-up, etc.

Preferred compositions of the present disclosure possess these properties while possessing low total VOC in the water-based compositions. In certain embodiments, the water-based compositions, particularly paints, include no greater than 50 grams VOC per 100 grams polymer solids, or no greater than 40 grams VOC per 100 grams polymer solids, or no greater than 35 grams VOC per 100 grams polymer solids, or no greater than 30 grams VOC per 100 grams polymer solids, or no greater than 25 grams VOC per 100 grams polymer solids, or no greater than 20 grams VOC per 100 grams polymer solids, or no greater than 15 grams VOC per 100 grams polymer solids, or no greater than 10 grams VOC per 100 grams polymer solids, or no greater than 5 grams VOC per 100 grams polymer solids, or no greater than 1 gram VOC per 100 grams polymer solids.

In certain aspects, the coating compositions described herein are suitable for use in low-VOC or zero-VOC paint to be used as an architectural coating or wall paint, including exterior and interior architectural coating or wall paints, especially a paint with at least a satin, semi-gloss or high gloss finish.

Polymers

The preferred polymers of the compositions of the present disclosure include latex or water-dispersible polymers. These are well known in the paint art and are typically particles emulsified or suspended in an aqueous medium. In preferred embodiments, the coating compositions are latex-based.

In certain aspects, the coating composition or paint described herein preferably includes one or more polymers or resins. The latex polymers preferably included in the polymer system may be homopolymers, or copolymers using one-component, two-component or multi-component blends. The latex polymers accordingly may be single stage or multistage polymers.

Preferably, the one or more latex polymers include one or more, typically two or more, ethylenically unsaturated monomers, such as, for example, (meth)acrylates (e.g. alkyl and alkoxy (meth)acrylates), cycloaliphatic (meth)acrylates (e.g. cyclohexyl (meth)acrylate), aryl (meth)acrylates (e.g., benzyl (meth)acrylate), vinyl esters of saturated carboxylic acids, monoolefins, conjugated dienes, polyfunctional (meth)acrylates, styrene, methyl methacrylate, vinyl acetate, acrylonitrile, vinyl chloride, other suitable vinyl monomers and the like. Other monomers are also contemplated, including acid-functional and anhydride-functional monomers, such as acrylic acid and methacrylic acid. Exemplary acid-functional and anhydride-functional monomers are disclosed in U.S. Pat. Nos. 5,609,963 and 5,863,998. Suitable latex polymers that may be disclosed in the compositions and paints of the present invention are disclosed in U.S. Pat. No. 9,822,275 B2.

In certain aspects, the coating composition or paint formulation comprises a multistage latex polymer, which is made using discrete, sequential charges of two or more monomers or monomer mixtures, or was made using a continuously-varied charge of two or more monomers. The two stages typically are different in composition. Exemplary methods for making a multistage latex are disclosed in U.S. Pat. No. 9,611,393, U.S. Patent Publication Nos. 2016/0145460, 2017/0335127, and US20170247565, the disclosures of the methods of making multistage latex compositions and multistage latex compositions in the foregoing being incorporated by reference in their entirety herein.

Various methods can be used to prepare the multistage latex described herein, including for example, sequential monomer feed and continuously varying monomer feed techniques. In a sequential monomer feed process, a first monomer or monomer mixture is fed during the early stages of polymerization, and a second monomer (e.g. a different monomer, or a mixture of monomers present in different ratios than in the first monomer mixture) is fed during later stages of polymerization. In a varying monomer feed process, a first monomer or monomer mixture is fed, followed by the addition of a second monomer or monomer mixture at certain points in the polymerization process, and at different speeds. By controlling the type of monomers selected for the feed process, a multistage latex suitable for low-VOC, coating compositions or paints may be formed, and the latex preferably provides excellent performance characteristics, such as, for example, block resistance, scrub resistance, tack resistance, and the like, for such coating or paint formulations.

In certain aspects, the multistage latex described herein is made by a sequential monomer feed process. In an aspect, polymerization begins with a high Tg monomer feed followed by a low Tg monomer feed, and vice-versa. In a preferred aspect, polymerization begins with a high Tg monomer feed, followed by a low Tg monomer feed.

In certain aspects, the multistage latex described herein is made using varying monomer feeds. The resulting polymer will typically have a DSC curve that exhibits no Tg inflection points, and could be said to have an essentially infinite number of Tg stages. The resultant multistage latex will have a gradient Tg from high to low, or vice-versa, depending on the order that monomers of high Tg are fed into the reaction.

In a preferred aspect, the multistage latex described herein is made by a sequential monomer feed process using at least two distinct feeds of monomers. In an aspect, a high Tg stage (viz. a hard stage) is fed first into a reactor vessel, and a low Tg stage (viz. a soft stage) is added at a later stage in the process. A multistage latex may be formed, and after coalescence, the composition will typically display two distinct Tg values, or at least one Tg corresponding to the monomer stage present at higher concentration. Without being bound to theory, it is expected that no distinct Tg will be observed or detected by DSC for a monomer or monomer mixture in a particular stage that is present in very small quantities relative to the other monomer or monomer mixture.

In an aspect, the multistage latex optionally includes a seed phase, e.g. a relatively small monomer or polymer particle, but the seed is not required, nor essential for preparation or optimal performance of the multistage latex when used in a coating composition or paint formulation.

In an aspect, the relative positions of the first and second phases may be internal and external respectively, or vice-versa. In another aspect, the first and second phases may be neighboring or adjacent. Without being bound by theory, it is believed that the relative position of the stages of the multistage latex is influenced by the method used to make the latex. By controlling the monomers used in each stage of the sequential monomer feed process, the multistage latex described herein may for example contain up to about 50 wt %, about 10 wt % to 50 wt %, preferably about 20 to 40 wt %, more preferably about 25 to 35 wt % of monomers of the first stage, e.g. high Tg or hard stage monomers, and more than about 50 wt %, about 50 wt % to 90 wt %, preferably about 60 to 80 wt %, more preferably about 65 to 75 wt % of monomers of the second stage, e.g. low Tg or soft stage monomers, based on the total weight of the monomers used to form the first and second stages. In embodiments that do not include any additional optional stages, the indicated amounts are based on the total weight of the monomers used to form the multistage latex.

In some aspects, the multistage latex may contain the hard stage monomers having a high Tg to the soft stage monomers having a low Tg in a ratio (hard stage monomers:soft stage monomers) between about 1:9 to about 1:1, more preferably about 1:4 to about 2:3, even more preferably about 1:3 to about 1:2. In some aspects, the multistage latex may contain a ratio of the monomers of a first stage to monomers of a second stage (first stage monomers:second stage monomers), wherein the first stage has a higher Tg than the second stage, between about 1:9 to about 1:1, more preferably about 1:4 to about 2:3, even more preferably about 1:3 to about 1:2.

In certain aspects, by controlling the monomers used for each stage of the sequential monomer feed process, a multistage latex composition with optimal minimum film forming temperature (MFFT) is obtained. The MFFT is the minimum temperature at which the latex composition will form a continuous film, viz. the temperature below which coalescence does not occur. The MFFT of the multistage latex composition as described herein is preferably less than about 25° C., more preferably less than about 20° C. A base paint or other paint that includes the multistage latex described herein preferably has an MFFT of less than about 20° C., more preferably less than about 10° C.

In certain aspects, the multistage latex described herein preferably includes at least two polymer portions (e.g., at least two different emulsion polymerized polymer stages) with different Tg values. In a preferred embodiment, the multistage latex includes at least a first stage and a second stage. The first stage (e.g., the high Tg or hard stage) preferably has a Tg of about 0° C. to about 120° C., more preferably about 25° C. to about 100° C., even more preferably about 40° C. to about 80° C., and even more preferably about 45° C. to about 80° C., and in certain preferred embodiments about 45° C. to about 70° C. or about 45° C. to about 60° C. The second stage (e.g., the low Tg or soft stage) preferably has a Tg of about −35° C. to about 10° C., more preferably about −20° C. to about 5° C., and even more preferably about −15° C. to about 3° C. In an embodiment, where the multistage latex is intended for use in a pigmented high gloss or semi-gloss paint, the first stage preferably has Tg of about 0° to about 120° C., more preferably about 25° to about 75° C., most preferably about 45° to about 60° C.

In certain aspects, the multistage latex preferably includes a first stage having a Tg of about 10° C. to about 120° C., more preferably about 25° C. to about 100° C., even more preferably about 45° C. to about 85° C., and in certain preferred embodiments about 70° C. to about 85° C. or about 45° C. to about 60° C.; and the second stage (e.g., the low Tg or soft stage) preferably has a Tg of about −35° C. to about 15° C., more preferably about −20° C. to about 10° C., and even more preferably about −15° C. to about 5° C., and in certain preferred embodiments about −15° C. to about 0° C. or about −5° C. to about 5° C. In an embodiment, the multistage latex is substantially devoid of any crosslinking monomers, such that the multistage latex has less than about 0.1 wt %, less than about 0.05 wt %, and in some aspects less than about 0.01 wt %, of any crosslinking monomer.

In certain aspects, the multistage latex described herein preferably includes at least two polymer portions, e.g. a first stage and a second stage, with different Tg values, where the difference in Tg (ΔTg) is at least about 35° C. In some embodiments, the ΔTg is at least about 60° C., and in an embodiment about 65° C. In some embodiments where the multistage latex is intended for use in a pigmented high gloss or semi-gloss paint, the difference in Tg (ΔTg) is preferably at least about 35° C., more preferably at least about 45° C., even more preferably at least about 50° C., and in some embodiments at least about 52° C. or at least about 55° C. In some such embodiments where the multistage latex is intended for use in a pigmented high gloss or semi-gloss paint, the ΔTg is less than about 115° C., more preferably less than about 80° C., even more preferably less than about 70° C., and in some embodiments less than about 65° C. or less than about 60° C.

In an embodiment, a multistage latex (e.g., for use in satin to high gloss enamels) is used that has at least two Tg values, as measured by DSC, of about 20 to about 30° C. and about 95 to 110° C. (e.g., about 26° C. and about 107° C. or about 28° C. and about 98° C.). Such a multistage latex maybe provided, for example, as a latex dispersion for use in formulating the paint or coating compositions, which preferably has about 45 to about 53 wt % solids (such as, e.g., about 49 wt %) and in which the multistage latex polymer preferably constitutes about 80 to about 100 wt % of the polymer solids. Such a multistage latex may be formed, for example, using monomers including DAAM. Such a dispersion may have, for example, a pH of about 9, an MFFT of about 15 to about 21° C. (e.g., 18° C.), a mean particle size of about 0.08 to about 0.14 micron (e.g., about 0.11 micron), and a viscosity (Brookfield Model RVT) of about 850 cps, #3/100 rpm. In certain aspects, the invention described herein includes a multistage latex polymer having at least a first stage and a second stage. In an aspect, the first stage and second stage of the multistage latex separately and preferably include one or more, typically two or more, ethylenically unsaturated monomers. In another aspect, the first and second stage of the multistage latex each separately and preferably include one or more ethylenically unsaturated monomers, more preferably two or more ethylenically unsaturated monomers, such as, for example, acrylates (e.g. alkyl and alkoxy (meth)acrylates), cycloaliphatic (meth) acrylates (e.g. cyclohexyl (meth)acrylate), aryl (meth)acrylates (e.g., benzyl (meth)acrylate), vinyl esters of saturated carboxylic acids, monoolefins, conjugated dienes, polyfunctional (meth)acrylates, styrene, methyl methacrylate, alkyl (meth)acrylates, vinyl acetate, acrylonitrile, vinyl chloride, other suitable vinyl monomers and the like. In an embodiment, the first stage or second stage, or both, of the multistage latex optionally includes one or more polyfunctional (meth)acrylate monomers (e.g., one or more multi-ethylenically unsaturated (meth)acrylates). In an embodiment, the first stage and second stage each separately and preferably also include one or more ethylenically unsaturated carboxyfunctional amide monomers or ureido-functional monomers, such as monomers formed as the product of the reaction between aminoalkyl alkylene urea (e.g., amino ethylene urea, for example) with an ethylenically unsaturated carboxylic acid or anhydride (e.g., maleic anhydride, for example).

Exemplary ethylenically unsaturated monomers for use in making the latex polymer include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, a-methyl styrene, vinyl toluene, vinyl acetate, vinyl propionate, allyl methacrylate, and mixtures thereof. Preferred monomers include styrene, methyl methacrylate, acrylic acid, methacrylic acid, acetoacetoxy ethyl methacrylate, butyl acrylate, and the like.

Exemplary polyfunctional (meth)acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional (meth) acrylate monomers include pentaerythritol tetraacrylate, dipentaerythritol tetraacrylate, and the like.

In some embodiments, one or more crosslinking monomers may be included. Examples of preferred crosslinking monomers include AAEM and DAAM. Any suitable amount of one or more suitable crosslinking monomers may be employed. When used, the latex will typically include at least about 0.1 wt %, at least about 0.5 wt %, at least about 1 wt %, or at least 2 wt % of one or more crosslinking monomers, based on the total weight of monomers used to make the latex. The latex will typically include less than about 10 wt %, less than about, 6 wt %, less than about 5 wt %, or less than about 4 wt % of one or more crosslinking monomers, based on the total weight of the monomers used to make the latex.

Exemplary ureido-functional monomers include, for example, monomers with —NR—(C=O)—NH— functionality, where R may be H, substituted or unsubstituted $C_1$-$C_{10}$ alkyl, substituted or unsubstituted $C_3$-$C_6$ cycloalkyl or heteroalkyl, and the like. Without being bound by theory, ureido-functional monomers are believed to promote the wet adhesion of a paint formulation to a substrate, including substrates coated with an alkyd, where the formulation includes the multistage latex described herein. If used, any suitable amount of ureido-functional monomer may employed. Examples of suitable amounts of ureido-functional monomer include about 0.1 to about 5 wt %, more typically about 0.5 to about 2 wt %, based on the total weight of monomers used to make the latex.

In certain preferred embodiments, the latex is a single or multistage latex formed from monomers including two or more, three or more, four or more of, or all of: methyl methacrylate, butyl acrylate, methacrylic acid (or acrylic acid), a ureido-functional monomer, and a crosslinking monomer preferably selected from diacetone acrylamide or 2-(acetoacetoxy)ethyl methacrylate. In some embodiments, the latex includes both methyl methacrylate and butyl acrylate, where the combined weight of methyl methacrylate and butyl acrylate is at least 50 wt %, at least 60 wt %, at least 70 wt %, at least 80 wt %, at least 85 wt %, or at least 90 wt %, based on the total weight of the monomers used to make the multistage latex polymer.

In a preferred embodiment, the first stage includes methyl methacrylate, butyl acrylate, methacrylic acid (or acrylic acid), DAAM, and a ureido-functional monomer. In a preferred embodiment, the second stage includes methyl methacrylate, butyl acrylate, DAAM, methacrylic acid (or acrylic acid), and a ureido-functional monomer. In another preferred embodiment, the first stage includes methyl methacrylate, butyl acrylate, methacrylic acid (or acrylic acid), DAAM, and a ureido-functional monomer, and the second stage includes methyl methacrylate, butyl acrylate, DAAM, methacrylic acid (or acrylic acid), and a ureido-functional monomer.

In a preferred embodiment, the first stage includes about 65-90 wt % methyl methacrylate, about 18-28% butyl acrylate, about 0.5-3 wt % methacrylic acid (some or all of which may optionally be replaced with acrylic acid), about 2-4 wt % DAAM, and optionally about 0.5-3 wt % ureido-functional monomer. In a preferred embodiment, the second stage includes about 25-35 wt % methyl methacrylate, 55-65 wt % butyl acrylate, about 2-4 wt % DAAM, about 0.5-3 wt % methacrylic acid (some or all of which may optionally be replaced with acrylic acid), and optionally about 0.5-3 wt % ureido-functional monomer. Preferably, at least one of the stages includes ureido-functional monomer for optimal performance.

Any suitable single stage latex may be employed in the compositions described herein. By way of example, suitable single stage latexes are described in U.S. Pat. No. 10,221, 332. In some embodiments, a single stage latex is prepared using a monomer mixture including one or more monomers having readily abstractable hydrogen atoms. Without limiting to any theory, it is believed that these monomers can enhance the effectiveness of certain UV-VIS absorbers, such as MBB for example. Suitable monomers of this type include, for example, 2-ethyl hexyl acrylate (2-EHA), AAEM, and the like. Such monomers are typically included in an amount of at least about 1 wt %, at least about 2 wt %, at least about 5 wt-%, or even at least about 10 wt-%, based on the total weight of monomers. Such monomers are typically used in an amount of less than about 30 wt-%, in some embodiments less than about 15 wt-%, in some embodiments less than about 12 wt-%, in some embodiments less than about 10 wt-%, or in some embodiments even less than about 6 wt-%, based on the total weight of monomers. In some embodiments, a single stage latex polymer is prepared from monomers including methyl methacrylate, butyl acrylate, methacrylic acid, and one or more of 2-EHA or AAEM. In some such single stage embodiments, the combined weight of methyl methacrylate and butyl acrylate is at least 50 wt %, at least 60 wt %, at least 70 wt %, at least 80 wt %, at least 85 wt %, or at least 90 wt %, based on the total weight of monomers. In some embodiments, a suitable single stage latex is prepared with any suitable Tg value, but in some embodiments a suitable Tg range is of about −15° C. to about 30° C., more preferably about −10° C. to about 10° C., even more preferably about −5° C. to about 5° C.

While styrene can be included in any suitable amount in the latexes of the compositions of the present disclosure, in some embodiments, the latexes include less than 10 wt-% of styrene, less than 5 wt-% of styrene, less than 2 wt-% of styrene, less than 1 wt-% of styrene, or do not include any intentionally added styrene (viz. a trace amount of styrene may still be present due to environmental contamination).

In certain aspects, the coating composition described herein includes, optionally and preferably, a fluorosurfactant. As used herein, the term "fluorosurfactant" refers to synthetic organofluorine compounds with multiple fluorine atoms. Such compounds can be polyfluorinated, perfluorinated (e.g. fluorocarbons), or partially fluorinated, and typically include a hydrophilic head and a fluorinated/hydrophobic tail. Suitable fluorosurfactants may be anionic or nonionic. Commonly used fluorosurfactants include, for example, fluoroalkanes, perfluoroalkanes, their derivatives, and the like. In an aspect, short chain fluorinated compounds are preferred, such as, for example, C1-C10 fluorinated compounds. In a preferred aspect, the fluorosurfactant is an anionic C6-fluorocarbon compound, and is preferably substantially free of PFOS and PFOA, and more preferably, essentially free of PFOS and PFOA. In a preferred aspect, the coating composition preferably includes up to about 0.5 wt %, more preferably about 0.1 to 0.3 wt % fluorosurfactant, based on the total weight of the coating composition.

In certain aspects, the amount of latex (latex solids and water from the latex) in the coating compositions or paint formulation is about 40 to about 60 wt %. In certain aspects, the total resin solids in the coating composition or paint formulation is about 10 to about 50 wt %, more preferably about 20 to about 40 wt %, and in some aspects about 25 to about 35 wt %. Any suitable portion of the resin solids in the coating composition or paint formulation may be latex resin solids. In some aspects at least 50% of the total resin solids, in some aspects at least 75% of the total resin solids, in some aspects at least 85% of the total resin solids, in some aspects at least 95% of the total resin solids, and in some aspects up to 100% of the total resin solids in the dispersion is latex resin solids. In certain aspects, the coating composition or paint formulation has a viscosity in the range from about 80 to about 120 KU (Krebs Unit).

In certain embodiments, the latex polymer particles include a homopolymer or copolymer including at least one of an acrylate or a methacrylate.

Exemplary commercially available latex polymers include AIRFLEX EF811 (available from Air Products); EPS 2533, EPS 2757, EPS 2792, EPS 2705, EPS 2741, EPS 2799 and EPS 2720 (available from EPS/CCA); NEOCAR 2300, NEOCAR 820 and NEOCAR 2535 (available from Arkema); RHOPLEX VSR 50 and RHOPLEX VSR 2015 (available from Dow Chemical Co.); OPTIVE 130 and OPTIVE 230 (available from BASF); and RACRYL 1008 and RAYCRYL 1247 (available from Specialty Polymers, Inc.). Other exemplary latex polymers include the latex polymers described in U.S. patent application No. US 2007/0110981 A1.

UV-VIS Absorbers (Free Radical Generators)

Compounds that are suitable for use in the present disclosure as UV-VIS absorbers include ultraviolet absorbers, visible light absorbers, or combinations thereof. These UV-VIS absorbers may also be referred to as generators. In some aspects the UV-VIS absorbers are capable of absorbing radiation within a range of 240-465 nm, preferably 240-400 nm, to be a free radical generator.

Suitable UV-VIS absorbers are preferably water-insoluble. By this it is meant that the compounds will not dissolve to an appreciable extent (i.e., will not dissolve in an amount of more than 5 wt-%) in water at the temperatures typically used for preparing water-based compositions as described herein (e.g., −20 to 60° C.).

In certain aspects, suitable UV-VIS absorbers are those compounds capable of absorbing ultraviolet and/or visible radiation within a range of 240-465 nm. For certain embodiments, they are capable of absorbing radiation in the 280-450 nm range. In certain other aspects, suitable visible light absorbers are those compounds capable of absorbing visible radiation within a range of 420-450 nm. In certain aspects, suitable ultraviolet absorbers are those compounds capable of absorbing UV radiation within a range of 240-400 nm. For certain embodiments, they are capable of absorbing UV radiation in the 280-400 nm range, and for certain embodiments in the 315-375 nm range.

Herein, the UV-VIS (preferably, ultraviolet) absorbers do not typically form a bond to the polymer; instead, without wishing to be bound by theory they are believed to be capable of generating a radical through a hydrogen-abstraction mechanism by absorbing UV-VIS (typically, UV) radiation. Although not wishing to be bound by theory, it may be that this results in surface crosslinking of the polymer. In some alternative embodiments, the UV-VIS absorbers may form a bond to the polymer.

Determining if a UV-VIS absorber is a free-radical generator can be accomplished by determining if the compound initiates polymerization of ethylenically unsaturated monomer upon exposure to UV light through standard analytical methods, such as, but not limited to, gel permeation chromatography (GPC), differential scanning calorimetry (DSC), FTIR spectroscopy, or NMR spectroscopy. Similarly, standard analytical methods can be used to determine if a compound abstracts a hydrogen atom from a polymer upon exposure to UV light.

Traditionally, paints with improved gloss retention have included ultraviolet absorbers comprising benzophenone, available from Lamberti, Gallaratte, Italy:

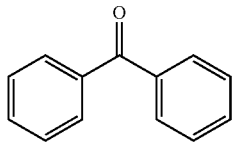 [SMILES: O=C(c1ccccc1)c1ccccc1]

In the present invention, in preferred embodiments the paint or composition is substantially free of benzophenone to minimize VOC. In some aspects, the paint or composition contains less than 0.3 wt-%, more preferably less than 0.25 wt-%, more preferably less than 0.2 wt-%, more preferably less than 0.15 wt-%, more preferably less than 0.1 wt-%, more preferably less than 0.05 wt-%, even more preferably about 0 wt-% of benzophenone. Instead, the UV-VIS absorber preferably comprises a substituted benzophenone preferably capable of being a free radical generator, and in some aspects the substituted benzophenone has Formula (I):

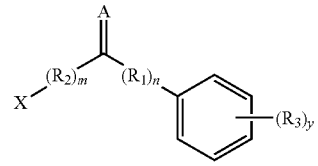

(Formula I)

wherein A is preferably an oxygen atom or N—NH$_2$, or optionally any other suitable atom or group; wherein n is 0 or 1, m is 0 or 1, and y is 0 to 5, with the proviso that n, m and y are preferably each 0 when A is N—NH$_2$; wherein R$_1$ and R$_2$, if present, independently from each other comprise an organic linking group, more preferably an organic linking group selected from CH$_3$—O—BO—CH$_3$ (see, e.g., 2,2-Dimethoxy-1,2-diphenylethanone below) or CH$_3$—CH$_2$—B—N—(CH$_3$)$_2$ (see, e.g., 2-Benzyl-2-(dimethylamino)-4'-morpholinobutryophenone below), wherein B is a backbone bridge carbon heteroatom; wherein R$_3$ comprises an organic substituent group, more preferably an alkanoyloxy group, C$_1$-C$_3$ alkyl, diethylaminogroup, or a 6-membered nitrogen and oxygen-containing saturated heterocyclic group (e.g., 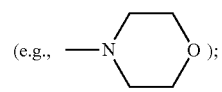 );

and wherein X is preferably a phenyl group, hydroxy-2-methyl-propyl group, an alkanoyloxy group, a phosphine oxide group, or any other suitable group (typically an organic group), with the proviso that when X comprises a phenyl group then the total of m, n and y is ≥1.

In some aspects, the substituted benzophenone has Formula (II):

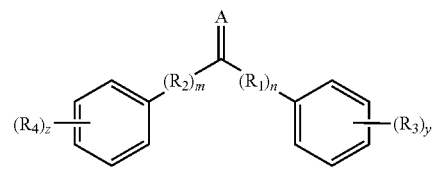

(Formula II)

wherein A is preferably an oxygen atom or N—NH$_2$, or optionally any other suitable atom or group; wherein n is 0 or 1, m is 0 or 1, y is 0 to 5, and z is 0 to 5, with the proviso that n, m, y and z are preferably each 0 when A is N—NH$_2$ and with the further proviso that the total of n, m, y and z is ≥1 when A is an oxygen atom; wherein R$_1$ and R$_2$, if present, independently from each other comprise an organic linking group, more preferably an organic linking group selected from CH$_3$—O—BO—CH$_3$ (see, e.g., 2,2-Dimethoxy-1,2-diphenylethanone below) or CH$_3$—CH$_2$—B—N—(CH$_3$)$_2$ (see, e.g., 2-Benzyl-2-(dimethylamino)-4'-morpholinobutryophenone below) wherein B is a backbone bridge carbon heteroatom; wherein R$_3$, and R$_4$, if present, independently from each other may comprise an organic substituent group, more preferably an alkanoyloxy group, C$_1$-C$_3$ alkyl, diethylaminogroup, a 6-membered nitrogen and oxygen-containing saturated heterocyclic group (e.g., 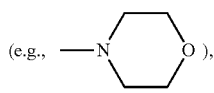), or form a bridge comprising a S atom.

In some aspects, the substituted benzophenone is a compound of Formula (II), wherein A is an oxygen atom, m and n are 0, y and z are each independently 0 to 5, and $R_3$, and $R_4$, or both, comprise at least a carbonyl-containing substituent group. In some aspects, the substituted benzophenone is a compound of Formula (II), wherein A is an oxygen atom, m and n are 0, y and z are each independently 0 to 5 such that $R_3$, and $R_4$, or both, comprise at least one para, ortho or meta substituent group that includes at least one carbonyl carbon atom. In certain preferred embodiments, the carbonyl carbon atom is attached directly to a carbon atom of a phenyl ring depicted in Formula II. In some such embodiments, the carbonyl carbon atom is attached ortho relative to a bridge (e.g., which links the phenyl ring to another phenyl ring). In certain other embodiments, the carbonyl carbon atom is attached directly to a carbon atom of a phenyl ring meta relative to the bridge. In certain other embodiments, the carbonyl carbon atom is attached directly to a carbon atom of a phenyl ring ortho relative to the bridge.

Examples of substituted benzophenones that are suitable UV-VIS absorbers include the following:

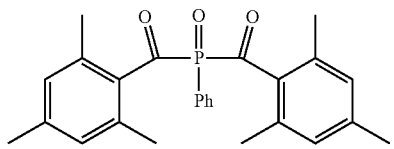

Phenylbis(2,4,6-trimethylbenzoyl)phosphine oxide, available under the trade name IRGACURE 819DW from BASF, Florham Park, N.J.;

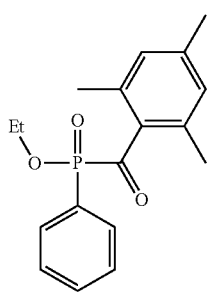

Ethyl-2,4,6-trimethylbenzoylphenylphosphinate, available under the trade name LUCIRIN TPO-L (formerly: LUCIRIN LR 8893) from BASF, Florham Park, N.J.;

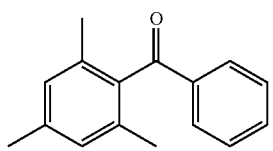

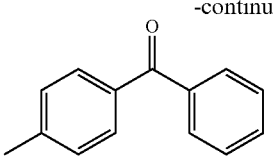

2,4,6-trimethylbenzophenone & 4-methylbenzophenone separately, or available as a mixture under the trade name ESACURE TZT from Lamberti, Gallaratte, Italy;

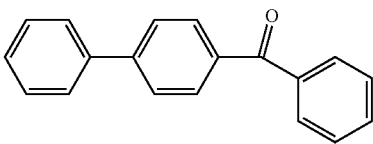 [SMILES: O=C(c1ccccc1)c1ccc(-c2ccccc2)cc1]

4-Phenylbenzophenone, available from Sigma-Aldrich;

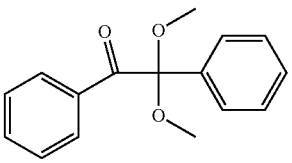 [SMILES: COC(OC)(C(=O)c1ccccc1)c1ccccc1]

2,2-Dimethoxy-1,2-diphenylethanone, available under the trade name ESACURE KB 1 from Lamberti;

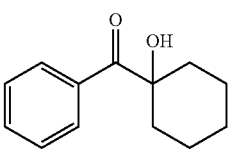 [SMILES: O=C(c1ccccc1)C1(O)CCCCC1]

1-Hydroxycyclohexyl phenyl ketone, available under the trade name ESACURE KS 300 from Lamberti;

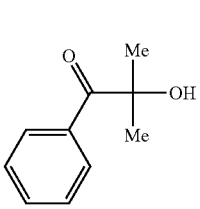 [SMILES: CC(C)(O)C(=O)c1ccccc1]

2-Hydroxy-2-methyl-1-phenyl-1-propanone, available under the trade name ESACURE KL 200 from Lamberti; Polymeric Benzophenone, available under the trade name EBECRYL P39 from Cytec, Woodland Park, N.J.;

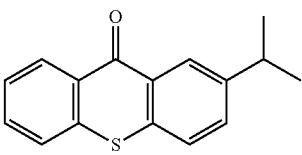 [SMILES: CC(C)c1ccc2sc3ccccc3c(=O)c2c1]

Isopropylthioxanthone, available under the trade name GENOCURE ITX from Rahn USA, Aurora, Ill.;

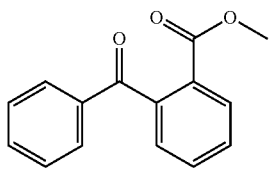 [SMILES: COC(=O)c1ccccc1C(=O)c1ccccc1]

Methyl-o-benzoyl-benzoate, available under the trade name GENOCURE MBB from Rahn;

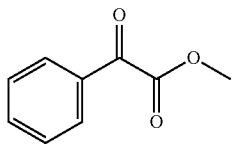

Methylbenzoylformate, available under the trade name GENOCURE MBF from Rahn;

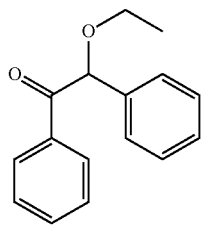 [SMILES: CCOC(C(=O)c1ccccc1)c1ccccc1]

Benzoin ethyl ether, available from Aldrich. St. Louis, Mo.;

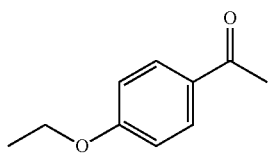

4'-Ethoxyacetophenone, from Aldrich. St. Louis, Mo.;

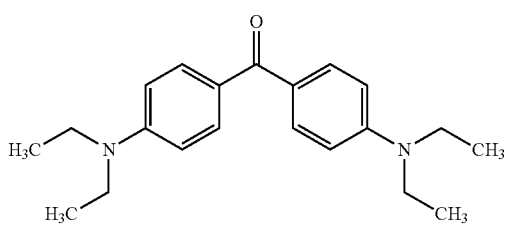 [SMILES: CCN(CC)c1ccc(C(=O)c2ccc(N(CC)CC)cc2)cc1]

4,4-Bis(diethylamino)benzophenone, available from Sigma-Aldrich;

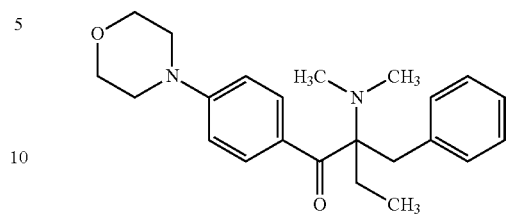

2-Benzyl-2-(dimethylamino)-4'-morpholinobutryophenone, available from Sigma-Aldrich;

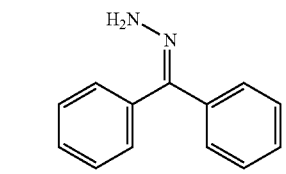 [SMILES: NN=C(c1ccccc1)c1ccccc1]

Benzophenone Hydrazone, available from Sigma-Aldrich; and combinations thereof.

Other suitable UV-VIS absorbers are available commercially from BASF under the trade designations IRGACURE and LUCERIN.

In some embodiments, the UV-VIS absorber includes at least one substituent group that includes at least one carbonyl carbon atom. In certain preferred embodiments, the carbonyl carbon atom is attached directly to a carbon atom of a phenyl ring. In some such embodiments, the carbonyl carbon atom is attached ortho relative to the bridge. In some other embodiments, the carbonyl carbon atom is attached meta relative to the bridge. In some other embodiments, the carbonyl carbon atom is attached para relative to the bridge. In some preferred embodiments, the substituent group that includes at least one carbonyl carbon atom is a carboxylic ester or a carboxylic acid.

In some embodiments, the substituted benzophenone comprises a substituent group attached to a carbon atom of one or more of the phenyl rings that is greater than 17 daltons, more preferably greater than 30 daltons, and most preferably includes at least one carbon atom and optionally one or more heteroatoms such as O, N, S and P.

In some embodiments, the substituted benzophenone comprises a substituent group attached to a carbon atom at an ortho position on at least one of the phenyl rings that is greater than 17 daltons, more preferably greater than 30 daltons, and most preferably includes at least one carbon atom and optionally one or more heteroatoms such as O, N, S and P.

In some embodiments, the substituted benzophenone comprises a substituent group attached to a carbon atom at a meta or para position on at least one of the phenyl rings that includes at least one carbon atom and optionally one or more heteroatoms such as O, N, S and P.

In some embodiments, the substituted benzophenone comprises at least one substituent group replacing a phenyl ring, wherein the substituent group is greater than 17 daltons, more preferably greater than 30 daltons, and most preferably includes at least one at least one carbon atom and optionally one or more heteroatoms such as, e.g., O, N, S and P.

In some embodiments, the substituted benzophenone comprises at least one bridge substitution that is greater than 17 daltons including the backbone bridge heteroatom, more preferably greater than 30 daltons including the backbone bridge heteroatom, and most preferably includes at least one carbon atom and optionally one or more heteroatoms such as, e.g., O, N, S and P.

In some embodiments, the substituted benzophenone comprises at least a nitrogen atom replacing the oxygen atom of the bridge ketone, most preferably comprising a hydrazine in the bridge backbone (see, e.g., Benzophenone Hydrazone above).

In some aspects, the UV-VIS absorbers do not contain a hydroxyl group at an ortho position on the phenyl relative to the bridge (or either of the phenyl relative to the bridge if two such phenyl groups are present). In some aspects, the UV-VIS absorbers do not contain a hydroxyl group at a meta position on the phenyl relative to the bridge (or either of the phenyl relative to the bridge if two such phenyl groups are present). In some aspects, the UV-VIS absorbers do not contain a hydroxyl group at a para position on the phenyl relative to the bridge (or either of the phenyl relative to the bridge if two such phenyl groups are present). In some aspects, the UV-VIS absorbers do not contain a hydroxyl group on the phenyl ring (or any of the phenyl rings if two or more are present), such that the paint or coating composition is substantially free of a hydroxylated substituted benzophenone.

In some aspects, the paint or composition contains less than 0.3 wt-%, more preferably less than 0.25 wt-%, more preferably less than 0.2 wt-%, more preferably less than 0.15 wt-%, more preferably less than 0.1 wt-%, more preferably less than 0.05 wt-%, and even more preferably about 0 wt-% of a hydroxylated substituted benzophenone. In some aspects, the paint or coating composition contains less than 0.3 wt-%, more preferably less than 0.25 wt-%, more preferably less than 0.2 wt-%, more preferably less than 0.15 wt-%, more preferably less than 0.1 wt-%, more preferably less than 0.05 wt-%, even more preferably about 0 wt-% of each of 2,4-dihydroxybenzophenone, 2,2',4,4'-tetrahydroxybenzophenone, oxybenzone, dioxybenzone, 2-hydroxy-4-(octyloxy)benzophenone, and 2-hydroxyphenyl-benzophenones.

The amount of the UV-VIS (preferably, ultraviolet) absorbers present in the water-based compositions of the present disclosure includes an amount that provides the desired result. In some aspects the one or more UV-VIS absorbers are present in the coating composition in amount of at least 0.2 wt-%, in some aspects at least 0.3 wt-%, in some aspects at least 0.4 wt-%, in some aspects at least 0.5 wt-%, in some aspects at least 0.6 wt-%, in some aspects at least 0.65 wt-%, in some aspects at least 0.70 wt-%, in some aspects at least 0.75 wt-%, in some aspects at least 0.80 wt-%, in some aspects at least 0.85 wt-%, in some aspects at least 0.90 wt-%, and in some aspects at least 0.95 wt-%, based upon the total resin solids in the coating composition. In certain aspects, the water-based compositions of the present disclosure include up to 5.0 wt-%, or up to 3.0 wt-%, or up to 1.5 wt-%, or up to 1.0 wt-%, of one or more UV-VIS (preferably, ultraviolet) absorbers, based on the total resin solids in the coating composition. For example, the wt-% of the UV-VIS absorber based upon the total resin solids in the coating composition is calculated by the amount of UV-VIS absorber divided by the total resin solids in the coating composition even though one or more hindered amine light stabilizers may also be present in the coating composition.

In some aspects, the one or more UV-VIS absorbers may be provided in another medium prior to be included in the water-based compositions of the present disclosure. For example, in some aspects, the one or more UV-VIS absorbers may be provided in a thermally-stable coalescent, a colorant, a base paint, a paint additive composition, a latex dispersion (e.g., for use in subsequently formulating a base paint), or the like. In certain aspects, the one or more UV-VIS absorbers are present in another medium individually or in combination with one or more other components such that the one or more UV-VIS absorbers are present in the coating composition in an amount as disclosed above.

Hindered Amine Light Stabilizers

Suitable hindered amine light stabilizers ("HALS") for use in water-based compositions of the present disclosure are those compounds containing amine functional group that are used, for example, as stabilizers in plastics and polymers. HALS are generally formulated from dialkylamines, specifically di-tert-alkylamines, and various derivatives thereof. HALS are also typically derivatives of tetramethylpiperidine, in some cases particularly 2,2,6,6-tetramethyl-piperidine derivatives, and are conventionally used to protect the polymers from the effects of photo-oxidation. HALS can be categorized according to their molecular weight (MW): HALS with low molecular weight of about 200 to 500 g/mole are commonly referred as low MW HALS, while those with a molecular weight of 2000 or higher are referred as high MW HALS. Any suitable HALS compounds or combinations of such compounds may be used. In some embodiments, a HALS compound is used that includes one or more heterocyclic rings (e.g., 5, 6 or 7 member rings) that include at least one nitrogen atom, wherein at least one, and more typically two, substituent groups (e.g., alkyl groups such as methyl groups) are attached to each adjacent ring atom (e.g., ortho carbon atoms) such that the nitrogen is sterically hindered. Exemplary HALS compounds are described, for example, in U.S. Pat. Nos. 4,344,876 and 6,843,939, which are hereby incorporated by reference in their entirety.

In some aspects, the one or more HALS is bis(1,2,2,6,6-pentamethyl-4-piperidyl) sebacate, methyl 1,2,2,6,6-pentamethyl-4-piperidyl sebacate, or mixtures thereof. It is contemplated that other tetramethylpiperidine derivatives may also be used in the present invention. In some aspects, the one or more HALS is provided as a liquid.

Other suitable HALS are available commercially from BASF under the trade designations TINUVIN and CIBA TINUVIN, such as TINUVIN™ 123-DW and TINUVIN 292 HP from Ciba Specialty Chemicals.

The amount of HALS present in the water-based compositions of the present disclosure includes any amount that provides the desired result. The UV-VIS absorber capable of being a free radical generator is believed to provide necessary crosslinking in the coating compositions of the present invention to help achieve the desired balance of coating properties. However, without wishing to be bound by theory, it is believed that too much crosslinking causes cracking, and thereby loss of gloss retention, whereas it is believed HALS help avoid excessive crosslinking before unwanted cracking can occur.

In some aspects the one or more HALS are present in the coating composition in amount of at least 0.4 wt-%, in some aspects at least 0.5 wt-%, in some aspects at least 0.6 wt-%, in some aspects at least 0.7 wt-%, in some aspects at least 0.8 wt-%, in some aspects at least 0.9 wt-%, in some aspects at least 1.0 wt-%, in some aspects at least 1.1 wt-%, in some aspects at least 1.2 wt-%, n some aspects at least 1.3 wt-%, in some aspects at least 1.4 wt-%, in some aspects at least 1.5 wt-%, in some aspects at least 1.6 wt-%, in some aspects at least 1.7 wt-%, in some aspects at least 1.8 wt-%, and in some aspects at least 1.9 wt-%, based upon the total resin solids in the coating composition. In certain aspects, the water-based compositions of the present disclosure include up to 5.0 wt-%, or up to 3.0 wt-%, or up to 2.5 wt-%, or up to 2.0 wt-%, of one or more HALS, based on the total resin solids in the coating composition. For example, the wt-% of the HALS based upon the total resin solids in the coating composition is calculated by the amount of HALS divided by the total resin solids in the coating composition even though one or more UV-VIS absorbers may also be present in the coating composition. While the concentrations are provided relating to the coating composition, the concentrations should also apply to a latex dispersion that may be used in forming a latex coating composition or paint.

In some aspects, the one or more HALS may be provided in another medium prior to be included in the water-based compositions of the present disclosure. For example, in some aspects, the one or more HALS may be provided in a thermally-stable coalescent, a colorant, a base paint, a paint additive composition, a latex dispersion (e.g., for use in subsequently formulating a base paint), or the like. In certain aspects, the one or more HALS are present in another medium individually or in combination with one or more other components such that the one or more HALS are present in the coating composition in an amount as disclosed above.

Coalescents

Suitable coalescents for use in water-based compositions of the present disclosure are those compounds that assist in coalescing latex or water-dispersible particles. That is, compounds that are good coalescents advantageously provide good film forming properties for the latex or water-dispersible polymer particles. Exemplary coalescents are disclosed in U.S. Pat. No. 9,822,275, the disclosure of which is hereby incorporated by referenced herein.

Preferably, the coating compositions include one or more coalescent compounds having a relatively low volatile organic content (low-VOC), and more preferably, a relatively low molecular weight.

Typically, the volatile organic content of suitable coalescents, as determined by ASTM D2369-90, is 30% or less, 20% or less, 15% or less, 11% or less, or 10% or less, based on the original weight of the coalescent.

Alternatively stated, suitable low-VOC coalescents can be identified by ASTM D6886-12 in terms of their elution from a gas chromatography column relative to methyl palmitate. Those coalescents that elute before methyl palmitate are too volatile to be useful in the water-based compositions of the present disclosure. Those coalescents that elute at the same time as or after methyl palmitate are sufficiently low-VOC coalescents for use in the water-based coating compositions of the present disclosure. Typically, using the standard chromatography conditions specified in ASTM D6886-12 compounds that elute at 18.4 minutes or more are acceptable. Those that elute at 20 minutes or more are more acceptable, and those that elute at 22 minutes or more are even more acceptable. Typically, suitable compounds elute at up to 30 minutes, or up to 28 minutes, or up to 26 minutes. Preferably, the number average molecular weights of such compounds are 750 or less, and more preferably, 500 or less.

In certain embodiments, suitable low-VOC coalescents assist in the formation of a continuous coating or film from the latex or water-dispersible particles after applying a coating composition containing such particles (e.g., a paint) to a surface and allowing it to dry (preferably, in certain embodiments, drying occurs while not reacting with the polymer particles) at room temperature for at least 7 days.

In certain aspects, a particularly desirable group of low-VOC coalescents are those that provide good film forming properties at low temperatures (e.g., below room temperature). Preferably, such compounds facilitate the formation of polymer films of the polymer particles at a temperature of less than 25° C. (more preferably, at a temperature of 4° C. to 10° C., and most preferably, at a temperature of 4° C. to 5° C.).

Suitable coalescents are dispersible in the water-based compositions, which are preferably stable over time. By this it is meant, the coalescent does not phase separate from the water-based composition upon standing at 49° C. for four weeks.

In certain aspects, suitable low-VOC coalescents are compatible with the polymer and other components in the system. That is, they are nonreactive in the composition. In certain embodiments, they are not crosslinkers of the polymer or otherwise reactive with the polymer.

In certain aspects, suitable low-VOC coalescents are not polymerizable monomers, such as acrylates and methacrylates.

The low-VOC coalescents can optionally also function as plasticizers and/or solvents. In particular, suitable low-VOC coalescents are those that can function as solvents for the UV-VIS (preferably, ultraviolet) absorbers. In some aspects, the low-VOC coalescents dissolve the one or more UV-VIS absorbers when heated to a temperature of at least 60° C.

In certain aspects, the concentration of the UV-VIS (preferably, ultraviolet) absorber and the hindered amine light stabilizers in the coalescent is at least 5 percent by weight (wt-%), or at least 10 wt-%, or at least 15 wt-%, or at least 20 wt-%, or at least 25 wt-%, or at least 30 wt-%, or at least 35 wt-%, or at least 40 wt-%, or at least 45 wt-%, based on total weight of the mixture (preferably, solution). In certain embodiments, the concentration of the UV-VIS (preferably, ultraviolet) absorber and the hindered amine light stabilizers in the coalescent is up to 30 wt-%, or up to 40 wt-%, or up to 50 wt-%, or up to 60 wt-%, or up to 70 wt-%, based on the total weight of the mixture (preferably, solution). In certain aspects, the UV-VIS absorber-HALS-coalescent blends (preferably, solutions) include less than 70 wt-% of one or more UV-VIS (preferably, ultraviolet) absorbers. Typically, an amount of less than 5 wt-% UV-VIS absorber in the blend does not deliver enough absorber to the final water-based composition for effective improvement in gloss retention, while an amount of more than 70 wt-% UV-VIS absorber in the blend exhibits a decline in gloss retention.

In certain aspects, the one or more water-insoluble UV-VIS absorbers and the one or more hindered amine light stabilizers are present in the absorber-HALS-coalescent mixtures (preferably, solutions) in a ratio of about 1:3 to about 7:3 based upon weight percentage. In certain other aspects, the one or more water-insoluble UV-VIS absorbers and the one or more hindered amine light stabilizers are present in the the absorber-HALS-coalescent mixtures (preferably, solutions) in a ratio of about 1:9 to about 7:3 based upon weight percentage.

In certain embodiments, such low-VOC coalescents are of the formula:

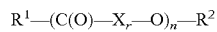

$$R^1—(C(O)—X_r—O)_n—R^2$$

wherein: n is 1 to 10; $R^1$ is an organic group, preferably, having less than 100 carbon atoms, and more preferably, having 3 to 24 carbon atoms; $R^2$ is hydrogen or an organic group, preferably, having less than 100 carbon atoms; and X is a divalent organic group, preferably, having 2 to 8 carbon atoms, and more preferably, 3 to 5 carbon atoms; and r is 0 to 1. Preferably, n is 1 to 5, more preferably, n is 1 to 3, and most preferably, n is 2 to 3.

Preferably, $R^1$ is a hydrocarbyl moiety, although for certain preferred embodiments $R^1$ is an organic group that includes substituents selected from the group of nonperoxidic oxygen atoms, carbonyl groups, hydroxyl groups, and combinations thereof, more preferably, substituents selected from the group of nonperoxidic oxygen atoms, hydroxyl groups, and combinations thereof, and most preferably, nonperoxidic oxygen atoms. For certain embodiments, $R^1$ has the formula $R^3$—$(CH_2)_m$—$(O(CH_2)_p)_q$— wherein $R^3$ is an alkyl or aryl group, m is 0 to 24, p is 1 to 4 (preferably, p is 1 to 2), and q is 0 to 50. In this preferred formulation for $R^1$, m+pq is preferably less than 23.

Preferably, X is a divalent hydrocarbyl moiety, although for certain preferred embodiments, X is an organic group that includes substituents selected from the group of nonperoxidic oxygen atoms, carbonyl groups, and combinations thereof, and more preferably, nonperoxidic oxygen atoms and carbonyl groups. For certain embodiments, X has the formula —$(CH_2)_s$— wherein s is 2 to 8, and preferably, s is 3 to 5.

For certain embodiments, X includes unsaturation. Preferably, X includes at least one carbon-carbon double bond. A preferred example of such a compound is bis(2-ethylhexyl)maleate (i.e., dioctyl maleate), which is available from commercial sources such as Aldrich Chemical Co., Milwaukee, Wis.

Preferably, $R^2$ is hydrogen, although for certain preferred embodiments $R^2$ is $R^1$ as defined above. For certain embodiments, r is one, preferably when $R^2$ is hydrogen.

For certain embodiments, $R^1$ includes at least three carbon atoms when X is not —$(CH_2)_s$— wherein s is 2 to 8; and $R^1$ and $R^2$ together include less than two aliphatic unsaturated carbon-carbon bonds when r is zero, preferably, $R^1$ and $R^2$ together do not include any aliphatic unsaturated carbon-carbon bonds when r is zero, and more preferably, $R^1$ and $R^2$ together do not include any aliphatic unsaturated carbon-carbon bonds.

For certain embodiments, $R^1$ is an organic group having 3 to 24 carbon atoms and substituents selected from the group of oxygen atoms, carbonyl groups, hydroxyl groups, and combinations thereof; and $R^2$ is hydrogen.

A preferred group of such compounds have the formula:

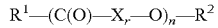

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$— wherein s is 2 to 8; with the proviso that the coalescent has less than two aliphatic unsaturated carbon-carbon bonds when r is zero. Such compounds can be made from caprolactone and an alcohol, for example.

Another preferred group of such compounds have the formula:

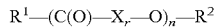

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$— wherein s is 2 to 8; with the proviso that the coalescent does not include aliphatic unsaturated carbon-carbon bonds; with the proviso that r is one when $R^2$ is hydrogen.

Another preferred group of such compounds have the formula:

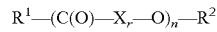

wherein: $R^1$ has the formula $R^3$—$(CH_2)_m$—$(O(CH_2)_p)_q$— wherein $R^3$ is an alkyl or aryl group, m is 0 to 24, p is 1 to 4, and q is 0 to 50; X has the formula —$(CH_2)_s$—, wherein s is 2 to 8; r is 0 to 1; n is 1 to 10; and $R^2$ is hydrogen or $R^1$.

Another preferred group of such compounds have the formula:

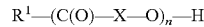

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10. Such compounds can be made from a glycidyl ester of neodecanoic acid (e.g., CARDURA E10) and a carboxylic acid, for example.

Another preferred group of such compounds have the formula:

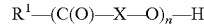

wherein: $R^1$ is a hydrocarbyl moiety or an organic group containing substituents selected from the group of nonperoxidic oxygen atoms, hydroxyl groups, and combinations thereof; X has the formula —$(CH_2)_s$—, wherein s is 2 to 8; and n is 1 to 10.

Another preferred group of such compounds have the formula:

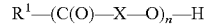

wherein: $R^1$ is a hydrocarbyl moiety or an organic group containing nonperoxidic oxygens; X is an organic group containing nonperoxidic oxygens and carbonyl groups; and n is 1 to 10.

In certain aspect, a coalescent has the formula:

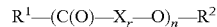

wherein: $R^1$ is an organic group having at least 3 and less than 100 carbon atoms: X is a divalent organic group; r is 0 or 1; n is 1 to 10; and $R^2$ is hydrogen or an organic group having at least 3 and less than 100 carbon atoms.

In certain aspects, a coalescent has the formula:

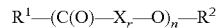

wherein: $R^1$ is an organic group having at least 3 and less than 100 carbon atoms, wherein the organic group is an aliphatic group, alicyclic group, heterocyclic group, or combinations thereof; X is a divalent organic group; r is 1; n is 1; and $R^2$ is hydrogen or an organic group having at least 3 and less than 100 carbon atoms; with the proviso that $R^1$ and $R^2$ together do not include any aliphatic unsaturated carbon-carbon bonds.

In certain aspects, a coalescent has the formula:

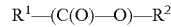

wherein: $R^1$ is an aromatic group having 3 to 24 carbon atoms; and $R^2$ is a hydrocarbyl moiety having 3 to 24 carbon atoms; with the proviso that $R^1$ and $R^2$ together do not include any aliphatic unsaturated carbon-carbon bonds.

In certain aspects, a coalescent has the formula:

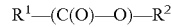

wherein: $R^1$ is an organic group having at least 3 and less than 100 carbon atoms, wherein the organic group is an aliphatic group, alicyclic group, heterocyclic group, or combinations thereof; $R^2$ is an organic group having less than 100 carbon atoms, wherein the organic group includes a hydroxyl group; and the coalescent has 1 to 2 aliphatic unsaturated carbon-carbon bonds.

In certain aspects, a coalescent has the formula:

$$R^1-(C(O)-X-O)_n-H$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; and n is 1 to 10; and the coalescent has 1 to 2 aliphatic unsaturated carbon-carbon bonds.

In certain aspects, a coalescent has the formula:

$$R^1-(C(O)-X-O)_n-R^2$$

wherein: $R^1$ is an organic group having at least 3 and less than 100 carbon atoms, wherein the organic group is an aliphatic group, alicyclic group, heterocyclic group, or combinations thereof; X is a divalent organic group; n is 1 to 10; $R^2$ is an organic group having less than 100 carbon atoms; the coalescent has one aliphatic unsaturated carbon-carbon bond, with the proviso that $R^1$ and $R^2$ together do not include any aliphatic unsaturated carbon-carbon bonds.

In certain aspects, a coalescent has the formula:

$$R^1-(C(O)-X-O)_n-R^2$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; n is 1 to 10; and $R^2$ is an organic group having less than 100 carbon atoms and includes one carbonyl group; with the proviso that the coalescent does not include any aliphatic unsaturated carbon-carbon bonds.

In certain aspects, a coalescent has the formula:

$$R^1-(C(O)-X-O)_n-R^2$$

wherein: $R^1$ is an aliphatic hydrocarbyl moiety and comprises 3 to 24 carbon atoms, X is a divalent organic group including oxygen atoms and 2 to 8 carbon atoms, n is 1, and $R^2$ is an organic group including 3 to 24 carbon atoms and one carbonyl group; with the proviso that the coalescent does not include any aliphatic unsaturated carbon-carbon bonds.

In certain aspects, a coalescent has the formula:

$$R^1(C(O)-X_r-O)_n-R^2$$

wherein: $R^1$ is a hydrocarbyl moiety having 3 to 24 carbon atoms, wherein the hydrocarbyl moiety is an aliphatic moiety, alicyclic moiety, heterocyclic moiety, or combinations thereof; X is a divalent organic group having 2 to 8 carbon atoms; r is 1; n is 1; and $R^2$ is an organic group having less than 100 carbon atoms and includes a carbonyl group; with the proviso that $R^1$ and $R^2$ together do not include any aliphatic unsaturated carbon-carbon bonds.

In certain aspects, a coalescent has the formula:

$$R^1-(C(O)-X-O)_n-H$$

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10.

In certain aspects, a coalescent has the formula:

$$R^1-(C(O)-X-O)-R^2$$

wherein: $R^1$ comprises an aromatic group having at least 3 and less than 100 carbon atoms; X is a divalent organic group comprising one or more nonperoxidic oxygen atoms; $R^2$ comprises an aromatic group having at least 3 and less than 100 carbon atoms; with the proviso that $R^1$ and $R^2$ together do not include any aliphatic unsaturated carbon-carbon bonds.

Examples of suitable low-VOC coalescents include, for example, those disclosed in U.S. Pat. No. 8,440,752. Specific examples include, for example: tergitols (e.g., that are available under the trade name TERGITOL, such as TERGITOL 15-S-15 from Dow), alkyl phthalate esters (e.g., dimethyl phthalate, diethyl phthalate, dibutyl phthalate, dioctyl phthalate, di-2-ethylhexyl phthalate, heptyl nonyl undecyl phthalate, butyl cyclohexyl phthalate, and dicyclohexyl phthalate); aryl phthalate esters (e.g., diphenyl phthalate); alkyl aryl phthalate esters (e.g., butyl benzyl phthalate); alkyl citrate esters (e.g., tributyl citrate and triethyl citrate); isosorbide di-alkyl ethers (e.g., dimethyl and diethyl isosorbide ether); alkyl maleates (e.g., dioctyl maleate and bis(2-ethylhexyl) maleate); alkyl adipate esters (e.g., bis(2-ethylhexyl) adipate and dioctyl adipate); alkyl aryl adipate esters (e.g., benzyl octyl adipate); benzoate esters (e.g., diethylene glycol dibenzoate, isodecyl benzoate, oxtyl benzoate); azelates (e.g., bis(2-ethylhexyl)azelate); ricinoleic acid esters; polyethylene glycol ethers; tri(ethylene glycol) bis(2-ethylhexanoate); tetra(ethylene glycol)bis(2-ethylhexanoate); glyceryl monooleate; octadecenoic acid methyl ester, and oleic acid monoester of propylene glycol; and fatty acid/oil derivatives such as those available from ADM under the trade designation ARCHER RC. Examples of preferred low-VOC coalescents include bis(2-ethylhexyl) maleate, bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid monoester of propylene glycol.

In certain aspects, preferred coalescents have VOC content of less than 100 g/L, less than 75 g/L, less than 50 g/L, less than 25 g/L, less than 15 g/L, less than 10 g/L, and in some aspects less than 5 g/L. Exemplary suitable coalescents include benzoates such as alkyl benzoates, monobenozates and dibenozates, dioctyl maleate, oleic acid propylene glycol esters, and other low-VOC compounds of the type described in U.S. Pat. Nos. 6,762,230 B2, 7,812,079 B2 and 8,110,624 B2 (collectively, Brandenburger et al.), in U.S. Pat. No. 8,106,239 B2 (Zhou et al.), and in U.S. Published Patent Application Nos. US 2010/0178494 A1 (Foster et al.) and US 2009/0149591 A1 (Yang et al.); mixtures thereof and the like. Other suitable low-VOC coalescents include EPS™ 9147 (Engineered Polymer Solutions & Color Corporation of America), hexanoates such as Optifilm™ 400 (Eastman Chemical, Kingsport Tenn.), Velate™ 368 (Eastman Chemical, Kingsport Tenn.), Loxanol™ (Cognis, Kankakee Ill., now BASF), Archer RC™ (ADM, Decator Ill.), and the like. Conventional coalescents such as, Texano™ (Eastman Chemical) and the like can also be used, either alone or in combination with other solvents such as, for example, 2-butoxyethanol (butyl cellosolve), diethylene glycol monobutyl ether (butyl carbitol), and the like, provided acceptable VOC levels are not exceeded in the coating composition or paint. When a coalescent is present, the coating compositions preferably contain about 0.05 to about 10 or about 0.05 to about 5 weight percent coalescent based on the final coating composition weight.

These compounds can be formed using standard organic synthesis techniques, which are well known to one of skill in the art.

The amount of the one or more low-VOC coalescents present in the water-based compositions of the present disclosure includes an amount that provides the desired result. Preferably, one or more relatively low-VOC coalescents, are present in a water-based composition in an amount of at least 1 wt-%, or at least 2 wt-%, or at least 3 wt-%, or at least 4 wt-%, or at least 5 wt-%, based on polymer solids. Preferably, one or more relatively low-VOC coalescents are present in a water-based composition in an amount of up to 10 wt-%, or up to 20 wt-%, based on polymer solids. When mixtures of such coalescents are used, the numerical values of the variables in the formulas described herein are averages.

In certain aspects, the UV-VIS absorber-HALS-coalescent blend is provided as a separate composition that can be added to a base paint. In certain aspects, the UV-VIS absorber-HALS-coalescent blend is provided as a thermally-stable coalescent blend composition. In other aspects, the UV-VIS absorber-HALS-coalescent blend is provided in a base paint. In other aspects, the UV-VIS absorber-HALS-coalescent blend is provided in a colorant.

In certain aspects, preferred UV-VIS absorber-HALS-coalescent blends have VOC content of less than 100 g/L, less than 75 g/L, less than 50 g/L, less than 25 g/L, less than 15 g/L, less than 10 g/L, and in some aspects less than 5 g/L.

In certain aspects, the thermally-stable coalescent blend composition is prepared by mixing one or more UV-VIS absorbers comprising a substituted benzophenone, preferably capable of absorbing radiation within a range of 240-465 nm and preferably capable of being a free radical generator, one or more hindered amine light stabilizers, and one or more low-VOC coalescents, at a temperature of about 60° C. to about 100° C. to form a blend. In some aspects, the one or more low-VOC coalescents and the one or more UV-VIS absorbers are heated to about 60° C. to about 100° C. until the one or more UV-VIS absorbers melts and the UV-VIS absorber and one or more hindered amine light stabilizers are mixed or stirred into the one or more low-VOC coalescents until fully dissolved. Once fully dissolved, the temperature of the blend is then reduced to ambient temperature (e.g., 20-25° C.) or below. In certain aspects, the thermally-stable coalescent blend composition is capable of maintaining the three components in solution at a temperature of −20° C. for a period of at least 30 days without any large crystals or precipitate forming, preferably no visible precipitate of UV-VIS absorber in the thermally-stable coalescent blend composition to an unaided eye when stored for at least 30 days at −20° C. or in some aspects ambient temperature, most preferably less than 1 wt-% of the UV-VIS absorber, if any, precipitates out of the thermally-stable coalescent blend composition when stored for at least 30 days at −20° C. or in some aspects ambient temperature (e.g., 20-25° C.).

In some aspects, prior to being blended in the thermally-stable coalescent blend composition, the UV-VIS absorber typically does not stay in solution when mixed in equivalent amount of the one or more low-VOC coalescents. Without wishing to be bound by theory, it is believed that the presence of the HALS in the thermally-stable coalescent blend composition maintains the UV-VIS absorber in solution.

Optional Additives

The composition described herein may include other components or additives, added to either the reaction mixture of monomers used to make the composition, to the thermally-stable coalescent blend composition, or to a base paint composition described herein. Methods of making paints will be familiar to those of skill in the art. Suitable additives used in paint compositions are known to those of skill in the art and include, without limitation, surfactants, open time agents, pH adjustors, initiator and chaser solutions, cross-linking agents, preservatives, defoaming agents, anticorrosive agents, fillers, thixotropes, rheological modifiers, matting agents, dispersing agents, and combinations thereof. The additives may include one or more ingredients added to a paint to modify the properties or enhance paint performance during storage, handling, application and other or subsequent stages. Desirable performance characteristics of a paint include, for example, chemical resistance, abrasion or scrub resistance, tack resistance, hardness, gloss, reflectivity, appearance and/or a combination of such properties and similar other properties. Preferred performance enhancing additives include lacquers, waxes, flatting agents, additives to prevent mar, abrasion and the like.

Exemplary dispersing agents include anionic polyelectrolyte dispersants such as maleic acid copolymers, acrylic acid copolymers including methacrylic acid copolymers, and carboxylic acids such as tartaric acid, succinic acid, citric acid, itaconic acid, mixtures thereof and other materials that will be familiar to persons having ordinary skill in the art.

Exemplary defoamers include silicones, ethylene oxide propylene oxide copolymers, oils and waxes such as FOAMSTAR™ A-32, FOAMSTAR A-34, FOAMSTAR A-36, FOAMSTAR A-38, FOAMSTAR A-39, FOAMASTER™ 111, FOAMASTER 333 and FOAMASTER SA-3 from Cognis, TEGO™ FOAMEX™ 810 from Evonik, mixtures thereof and other materials that will be familiar to persons having ordinary skill in the art, including products from other suppliers such as Air Products and Chemicals, Ashland, BASF, BYK-Gardner USA, Cytec, Rhone Poulenc and Troy Corporation.

Exemplary surfactants or dispersants include anionic, amphoteric and nonionic materials. Commercially-available surfactants or dispersants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant or dispersant is present, the coating compositions preferably contain about 0.1 to about 10 weight percent and more preferably about 1 to about 3 weight percent surfactant or dispersant based on the total composition weight.

The disclosed coating compositions may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include anti-cratering agents; biocides, fungicides, mildewcides and preservatives (e.g., BUSAN™ 1292 from Buckman Laboratories, Inc., NOP-COCIDE™ N-40D from Cognis, KATHON™ LX from Rohm & Haas, and POLYPHASE™ 663, POLYPHASE 678 and POLYPHASE PW-40 from Troy 5 Corporation); curing indicators; heat stabilizers; leveling agents; optical brighteners; wetting agents (e.g., BYK™ 346 and BYK 348 from Altana, PENTEX™ 99 from Rhodia and TROYSOL LAC™ from Troy 10 corporation); waxes (e.g., AQUACER™ 593 from Altana, HYDROCER™ 303 from Shamrock Technologies, Inc. and MICHEM™ Emulsion 32535 from Michelman, Inc.); and the like. The types and amounts of these and other adjuvants typically will be empirically selected.

The disclosed coating compositions may be packaged in any convenient packaging suitable for storing a desired quantity of the coating composition during storage. Exemplary packaging containers include cans, pails, bottles, drums, totes and tanks. The disclosed compositions may be factory-applied to substrates such as building components at a manufacturing site, or may be supplied to end users and applied onsite to finished articles, e.g., as paints for use on architectural surfaces.

In certain aspects, the coating compositions of the present invention can be used as a paint formulation, including a base paint to be colored or tinted at the point-of-sale of a paint of desired color and finish. In an aspect, the base paint may be clear (unpigmented) or pigmented prior to being colored or tinted. In certain aspects, the base paint contains about 30 wt. % to about 60 wt. % water, which may be tap, deionized, distilled, reverse osmosis or recycled water. In some aspects, the coating composition is a water-based paint with a pigment volume concentration (PVC) of at least 40%. Typical PVC ranges for flat paints are 35 to 75% for semi-gloss are 20 to 40%, while a high gloss paint has PVC ranges of about 10 to 25%.

In certain aspects, the base paint is tinted or colored in-store using one or more commercially available colorants. Suitable colorants which can be used in a coating composition or paint formulation include, for example, NovoColor (Color Corp. of America, Louisville, Ky.) colorants, e.g. zero-VOC colorants compatible with water-based coating compositions as described herein. Preferred colorant compositions include a colorant component, e.g. a pigment dispersed in a liquid phase, a surfactant package that includes a latex-compatible surfactant, a carrier, and other optional additives. Exemplary colorant compositions include single colorant formulations compatible with latex paints, of the kind described in U.S. Pat. Nos. 6,488,760 and 7,659,340. These colorant compositions are uniform and do not require mixing before addition to a base paint formulation, have extended shelf-life, and show viscosity increase of less than about 15 KU, more preferably less than about 10 KU, when stored over an extended period of time at temperatures of about 40° to 50°.

In an aspect, the coating composition can be used in a base paint formulation to be tinted to produce a dark or deeply colored paint. To produce such dark or deeply colored paint requires a high colorant load. In an aspect, the amount of colorant to be added to the base paint is determined by the desired color and finish (e.g. glossy, semi-gloss, satin, etc.) of the colored paint. Preferably, the paint includes up to about 20 wt % colorant, more preferably about 5 to 15 wt % colorant, and most preferably about 8 to 12 wt % colorant.

In certain aspects, the coating composition comprises an in-store tintable liquid base paint formulation in a container having headspace sufficient to receive a quantity of one or more colorants (preferably low-VOC colorants), wherein the colorant preferably has less than about 20 g/L VOC, less than about 15 g/L VOC, less than about 10 g/L VOC.

In an embodiment, the coating compositions described herein may be used to make semi-gloss and high gloss paint formulations. By "semi-gloss" is meant a paint finish that has a moderately satin-like luster and has a 60° gloss rating of at least about 20, more preferably at least about 30, more preferably at least about 35, more preferably about 35 to 70 units. A "high gloss" paint finish has a shiny appearance and reflects light in a specular or mirror-like direction. High gloss paints have 60° gloss ratings of at least about 70, more preferably at least about 75, more preferably at least about 80, more preferably at least about 85, and even more preferably greater than 85 units.

The water-based compositions can be prepared by a method that includes: providing an aqueous polymer dispersion or composition comprising a latex or water-dispersible polymer in water; providing one or more UV-VIS (preferably, ultraviolet) absorbers comprising a substituted benzophenone capable of being a free radical generator (preferable capable of absorbing radiation within a range of 240-465, more preferably 240-400 nm); providing one or more HALS; optionally providing one or more low-VOC coalescents; and optionally providing an additive package comprising at least one of a pigment, a thickener, a mildewcide, a biocide, a defoamer, a surfactant, a dispersant, a filler, and combinations thereof; and combining at least the one or more UV-VIS (preferably, ultraviolet) absorbers and the one or more HALS into the aqueous polymer dispersion or composition.

In some aspects where the one or more low-VOC coalescents is present, at least the one or more UV-VIS (preferably, ultraviolet) absorbers can be dissolved in the one or more low-VOC coalescents to form an absorber-coalescent mixture (preferably, solution). Before or after mixing the aqueous polymer dispersion or composition with the optional additive package, the absorber-coalescent mixture can be mixed with the aqueous polymer dispersion or composition, with the one or more HALS also added before or after the absorber-coalescent mixture is combined with the aqueous polymer dispersion or composition.

In a preferred method, the one or more water-insoluble UV-VIS (preferably, ultraviolet) absorbers and the one or more HALS are dissolved in the one or more low-VOC coalescents to form a thermally-stable coalescent blend composition. The thermally-stable coalescent blend composition is then mixed with the aqueous polymer dispersion or composition to form a water-based coating. Before or after mixing the aqueous polymer dispersion or composition with the thermally-stable coalescent blend composition, the optional additive package can be mixed with the aqueous polymer dispersion or composition, the thermally-stable coalescent blend composition, or both to form the water-based coating, preferably a paint.

In certain other aspects, the one or more UV-VIS (preferably, ultraviolet) absorbers and the one or more HALS are mixed with the aqueous polymer dispersion or composition at the end of the latex polymerization reaction while the aqueous polymer dispersion or composition is still hot enough to melt the one or more UV-VIS absorbers. In this process, the one or more low-VOC coalescents are optional and may be added after the aqueous polymer dispersion or composition, one or more UV-VIS (preferably, ultraviolet) absorbers, and the one or more HALS, are already mixed.

In the above exemplary preparation procedures, reference was made to use of one or more low-VOC coalescents. While less preferred, it should be understood that one or more coalescents that are not low-VOC coalescents may be used instead of, or in addition to, the one or more low-VOC coalescents, if desired.

In some aspects, the coating composition when used in paint (e.g., architectural paint), such as a semi-glossy or glossy finish paint for example applied to a substrate and allowed to dry as a film has a markedly improved gloss retention over paints that do not have both the UV-VIS absorber comprising a substituted benzophenone and HALS present. In some aspects, the coating composition when used in paint has at least 80% gloss retention, in some aspects at least 85% gloss retention, in some aspects at least 90% gloss retention, in some aspects at least 95% gloss retention, in some aspects at least 97% gloss retention, in some aspects at least 98% gloss retention, in some aspects at least 99% gloss retention, and in some aspects at least 100% gloss retention, the gloss retention being after at least 2000 hours measured by QUVA gloss retention at 60-degree gloss according to ASTM G154, using Cycle 1 as listed in the standard, with the coating composition applied as film to a 3×6 aluminum Q panel using a wire wound drawdown bar (RDS) to a film thickness of about 3 mils.

In some aspects, the coating composition when used in paint (e.g., architectural paint) and allowed to dry on a substrate as a dried film has an initial minimum gloss rating of at least 20 (satin-like), at least 35 (traditional semi-gloss), at least 70 (traditional gloss/high gloss architectural), at least 85 (high gloss) units with a 60-degree gloss meter, and the dried film has a gloss retention of at least 90% over 2000 hours as measured at 60-degree gloss. In some aspects, the dried film applied to a substrate has a gloss retention of less than a 10 unit drop over 2000 hours measured at 60-degree gloss according to ASTM G154, using Cycle 1 as listed in the standard, with the coating composition applied as film to a 3×6 aluminum Q panel using a wire wound drawdown bar (RDS) to a film thickness of about 3 mils.

In some aspects, the coating composition comprising the one or more UV absorbers, one or more hindered amine light stabilizers and optional coalescent is an intermediate for further formulation to form an architectural finish paint.

EXAMPLES

The invention is illustrated by the following examples. The disclosed examples, materials, amounts, and procedures are merely exemplary. Unless otherwise indicated, all parts and percentages are by weight and all molecular weights are weight average molecular weight. Unless otherwise specified, all chemicals used are commercially available from, for example, Sigma-Aldrich, St. Louis, Mo. or other commercial suppliers.

In the following examples, the coating compositions comprised EPS 2799 polymer (Acrylic Latex Polymer, 50% solids) and were formulated into a high gloss white paint made by conventional paint formulation methods known to one of ordinary skill in the art. The differences in the paints in the following examples are in relation to the UV-VIS absorbers, hindered amine light stabilizers and optional coalescent, as specified in the Examples.

Example 1—Gloss Retention Efficacy of a Substituted Benzophenone

The efficacy of the UV-VIS absorber being a substituted benzophenone compared to benzophenone (BP) is illustrated using methyl o-benzoyl benzoate (MBB) as the substituted benzophenone. Five coating composition samples were prepared using the amounts of BP, MBB and Tinuvin 292 as the hindered amine light stabilizers (HALS), as shown in Table 1 below, the percent being weight-percent based upon the total resin solids. The first sample (51) served as a control without any UV-VIS absorber MBB or BP and also without any HALS. The second sample (S2) only contained the UV-VIS absorber MBB without any HALS. The third sample (S3) contained the UV-VIS absorber MBB with HALS. The fourth sample (S4) only contained the UV-VIS absorber BP. The fifth sample (S5) contained the UV-VIS absorber BP and HALS. Each of the five coating composition samples were prepared by adding the UV-VIS absorber (MBB or BP) and the HALS, if present, at the end of an emulsion polymerization reaction while the polymer was still at a high temperature of about 60° C. A paint formulation was prepared from the emulsion and tested for long-term gloss retention.

Each of the five coating composition samples were applied as a paint film to a 3×6 aluminum Q panel using a wire wound drawdown bar (RDS) to a film thickness of about 3 mils. Each of the applied coatings were dried for 24 hours at ambient temperature (20-25° C.), and initial gloss readings were taken. Dried panels were then placed in a QUVA cabinet and exposed to some sunlight for the amount of time provided in Table 1. At each of the time intervals in Table 1, gloss retention readings were taken. The initial gloss reading and each of the gloss retention readings were measured at 60-degree gloss according to ASTM G154, using Cycle 1 as listed in the standard.

TABLE 1

Gloss Retention of Substituted Benzophenone MBB Compared to Benzophenone.

| Hours | (S1) 0% MBB or BP 0% HALS 60° Gloss | (S2) 0.65% MBB 0% HALS 60° Gloss | (S3) 0.65% MBB 1.9% HALS 60° Gloss | (S4) 0.5% BP 0% HALS 60° Gloss | (S5) 0.5% BP 1.9% HALS 60° Gloss |
|---|---|---|---|---|---|
| 0 | 79.3 | 80.9 | 81.3 | 73.7 | 74.6 |
| 24 | 77.7 | 82.4 | 83.9 | 76.2 | 76.7 |
| 142 | 74.1 | 85 | 88.4 | 75.1 | 78.6 |
| 237 | 70.4 | 82.4 | 86 | 71.7 | 76.1 |
| 335 | 71 | 83.7 | 87 | 71.5 | 76.8 |
| 572 | 67.8 | 85.8 | 87.1 | 68 | 75.9 |
| 733 | 64.7 | 84.5 | 86.2 | 64.4 | 73.6 |
| 897 | 62.3 | 85.4 | 86.9 | 61.7 | 72.6 |
| 1112 | 56.2 | 83 | 85.3 | 58.1 | 70.2 |

The presence of only BP (S4) in the coating composition did not improve gloss retention compared to the coating composition control (S1) without any UV-VIS absorber or HALS. The coating composition sample having HALS with BP (S5) had slightly improved gloss retention with a steady reduction of gloss retention through 1200 hours. The presence of only MBB (S2) and also MBB with HALS (S3) in the coating composition had over 100% gloss retention through 1200 hours. The presence of MBB and HALS (S3) in the coating composition had an improved gloss retention over just the presence of MBB alone (S2). The substituted benzophenone, methyl o-benzoyl benzoate, had a more effective gloss retention than benzophenone alone or in the presence of HALS through 1200 hours.

Example 2—Synergistic Gloss Retention by a Substituted Benzophenone and HALS

The gloss retention coating compositions is enhanced when the coating composition has a UV-VIS absorber and HALS, as opposed to only one of the components. Four coating composition samples were prepared using the amounts of MBB and Tinuvin 292 as (HALS, as shown in Table 2 below, the percent being weight-percent based upon the total resin solids. Sample S6 served as a control without the presence of MBB or HALS. Sample S7 only had HALS present in the coating composition. Sample S8 only had MBB present in the coating composition. Sample S9 had MBB and HALS present in the coating composition. Each of the coating composition samples were prepared by adding MBB and the HALS, if present, at the end of an emulsion polymerization reaction while the polymer was still at a high temperature, with the MBB added at about 60° C. and Tinuvin 292 added at about 50° C. A paint formulation was prepared from the emulsion and tested for long-term gloss retention. The coating composition samples were applied as a paint film to a 3×6 aluminum Q panel and gloss retention readings were measured as discussed in Example 1.

TABLE 2

Synergistic Gloss Retention Effect of MBB and HALS in a Coating Composition.

| Hours | (S6) 0% MBB 0% HALS 60° Gloss | (S7) 0% MBB 1.9% HALS 60° Gloss | (S8) 0.65% MBB 0% HALS 60° Gloss | (S9) 1% MBB 1.9% HALS 60° Gloss |
|---|---|---|---|---|
| 0 | 78.6 | 79.9 | 78.6 | 80 |
| 165 | 64.8 | 69.6 | 80.7 | 84.6 |
| 331 | 62.1 | 68.5 | 82.8 | 86.4 |
| 500 | 60.9 | 68.4 | 84.6 | 87.7 |
| 668 | 59.4 | 66.9 | 85.5 | 87.7 |
| 833 | 57.4 | 66.8 | 85.4 | 87.4 |
| 1000 | 55.2 | 65.3 | 85.9 | 88 |
| 1169 | 52 | 62.2 | 82.3 | 84.7 |
| 1338 | 51.3 | 62.9 | 82.7 | 86.3 |
| 1505 | 52 | 63.2 | 82.5 | 88.3 |
| 1693 | 53.1 | 62.2 | 78.3 | 87.8 |
| 2007 | 51.4 | 59.7 | 64.9 | 83.8 |
| 2174 | 52 | 58.4 | 55.3 | 80.3 |
| 2358 | 52.3 | 58.2 | 44 | 78.4 |
| 2499 | 51.4 | 58.4 | 37.5 | 78.7 |
| 2666 | 50.4 | 56.9 | 31.1 | 75.4 |
| 2812 | 49.9 | 56.4 | 28 | 73.8 |
| 2977 | 49.1 | 56.9 | 26.5 | 71.1 |
| 3077 | 45.8 | 54.6 | 24.4 | 67.3 |
| 3266 | 44.3 | 54.2 | 23.1 | 64.4 |
| 3408 | 40.7 | 54.4 | 21.7 | 61.8 |
| 3592 | 36.8 | 54 | 19.5 | 57.6 |
| 3779 | 33.5 | 53.8 | 17.7 | 55.3 |

The data in Table 2 is graphed for each of the samples in FIG. 1. Without any UV-VIS absorber or HALS present in the coating composition sample (S6), the measured gloss retention begins to fall immediately upon accelerated weathering. The coating composition sample (S7) with just HALS present had some improvement in gloss retention over the control (S6), but the measured gloss retention still falls immediately upon accelerated weathering. The coating composition sample (S8) with just MBB present had good gloss retention to approximately 1500 hours before the measured gloss retention starts to fall. The coating composition sample (S9) with both MBB and HALS has over 100% gloss retention at 2000 hours, demonstrating the synergistic effect of having both the UV-VIS absorber and HALS. The synergistic effect of the MBB and HALS was surprising to the inventors, as the effect of simply HALS alone does not account for the improved gloss retention in the coating composition across the entire range of 2000 hours.

Example 3—Hydroxylated Benzophenone Derivatives

The efficacy of the UV-VIS absorber being a hydroxylated benzophenone derivative was compared to the UV-VIS absorber being a substituted benzophenone, as shown in Table 3 below, the percent being weight-percent based upon the total resin solids. Sample S10 served as a control without the presence of any UV-VIS absorber. In sample S11, MBB was present in the coating composition as the UV-VIS absorber in an amount of 0.65 wt-%. In samples S12-S16, a hydroxylated benzophenone derivative was present in the coating composition as the UV-VIS absorber at a weight percentage that is a molar equivalent level to what was used in S11. Sample S12 had 2,4-dihydroxybenzophenone as the UV-VIS absorber, Sample S13 had 2,2',4,4'-tetrahydroxybenzophenone as the UV-VIS absorber, Sample S14 had oxybenzone as the UV-VIS absorber, Sample S15 had dioxybenzone as the UV-VIS absorber, and Sample S16 had 2-hydroxy-4-(octyloxy)benzophenone as the UV-VIS absorber. Tinuvin 292 in the amount of 1.9% was the hindered amine light stabilizer in each sample. In samples S12 and S13, the UV-VIS absorber was dissolved in the monomer mixture before polymerization. In samples S14-S16, the UV-VIS absorber were added after polymerization by dissolving the UV-VIS absorber and HALS in coalescent at an elevated temperature (about 70° C., about 80° C., and about 50° C., respectively) and then returning the mixture to room temperature and immediately adding to the base paint formulation while the UV-VIS absorber-coalescent solution was still a clear solution with no indication of precipitate. The paint formulations were tested for long-term gloss retention. The coating composition samples were applied as a paint film to a 3×6 aluminum Q panel and gloss retention readings were measured as discussed in Example 1.

TABLE 3

Gloss Retention Efficacy of Benzophenone Derivatives as UV-VIS absorber.

| Hours | (S10) Control 60° Gloss | (S11) MBB 60° Gloss | (S12) BP-OH1 60° Gloss | (S13) BP-OH2 60° Gloss | (S14) BP-OH3 60° Gloss | (S15) BP-OH4 60° Gloss | (S16) BP-OH5 60° Gloss |
|---|---|---|---|---|---|---|---|
| 0 | 80 | 80 | 78.5 | 78.4 | 78.5 | 77.6 | 79.2 |
| 167 | 70 | 81.2 | 67.1 | 65.1 | 64.8 | 65.1 | 67.2 |
| 329 | 66.2 | 81.3 | 66 | 62.5 | 60.9 | 62.5 | 65.4 |
| 497 | 62.6 | 80.9 | 61.4 | 58.1 | 56.7 | 58.1 | 61.8 |
| 664 | 58.2 | 82 | 58.3 | 54.5 | 51.9 | 54.6 | 56.7 |
| 831 | 54.2 | 82.1 | 54.4 | 51.2 | 48.5 | 51.1 | 54.1 |
| 999 | 52.9 | 81.9 | 52.4 | 48.8 | 46.9 | 49.5 | 53.2 |

The gloss retention for all samples S12-S16 having a hydroxylated benzophenone derivative began to fall immediately upon accelerated weathering. After 1000 hours, the coating compositions having the hydroxylated benzophenone derivative were not improved over the control. The coating composition having MBB maintained gloss retention after the 1000 hours. This data illustrates that hydroxylated benzophenone derivatives are not viable UV-VIS absorbers for retaining gloss retention.

Example 4—Gloss Retention Efficacy of 4-Methylbenzophenone

The UV-VIS absorber being 4-methylbenzophenone (4MBP) was compared to MBB, as shown in Table 4 below, the percent being weight-percent based upon the total resin solids. Sample S17 served as a control without the presence of any UV-VIS absorber or HALS. MBB was the UV-VIS absorber in the coating composition of sample S18, while in sample S19 the UV-VIS absorber was 4MBP. The coating composition of Sample S20 contained 4MBP and HALS. Each of the coating composition samples were prepared by adding the UV-VIS absorber and HALS, if present, at the end of an emulsion polymerization reaction while the polymer was still at a high temperature of about 60° C. A paint formulation was prepared from the emulsion and tested for long-term gloss retention. The coating composition samples were applied as a paint film to a 3×6 aluminum Q panel and gloss retention readings were measured as discussed in Example 1.

TABLE 4

Gloss Retention of Substituted Benzophenone 4-MBP.

| Hours | (S17) Control 60° Gloss | (S18) 0.65% MBB 60° Gloss | (S19) 0.54% 4MBP 60° Gloss | (S20) 0.54% 4MBP 1.9% HALS 60° Gloss |
|---|---|---|---|---|
| 0 | 80 | 78 | 77.8 | 78.8 |
| 192 | 69.7 | 80.3 | 77.2 | 84 |
| 455 | 63.7 | 77.4 | 71.6 | 81.8 |
| 507 | 63.9 | 78.8 | 72.9 | 82.5 |
| 622 | 61.3 | 78.6 | 72.5 | 81.7 |
| 695 | 59.6 | 78 | 71.1 | 80.6 |
| 865 | 56.3 | 78.8 | 72 | 80.6 |
| 1008 | 55.9 | 78.5 | 71.4 | 80.2 |
| 1152 | 54.1 | 75.9 | 70.5 | 78.5 |
| 1318 | 51.8 | 74.4 | 69.2 | 78.8 |
| 1487 | 52.5 | 69.5 | 68.7 | 78.1 |
| 1655 | 51.6 | 63.2 | 64.8 | 77.6 |
| 1820 | 53.1 | 55.8 | 60 | 76.8 |
| 1987 | 53.2 | 46.2 | 54.3 | 76.5 |
| 2156 | 49.5 | 34.5 | 45.7 | 72.4 |

The gloss retention for the coating composition sample having 4MBP alone had a slightly poorer performance than the sample having MBB alone. When the 4MBP was used in combination with HALS in the coating composition, the 4MBP had greater than 90% gloss retention at 2000 hours.

Example 5—Dirt Pick-Up Resistance

Coating composition Samples S10-S16 in Example 3 and Sample S19 in Example 4 were tested for dirt pick-up resistance. Two additional coating compositions comprising 2,2-dimethoxy-2-phenylacetophenone (BDK) as the UV-VIS absorber without HALS (S20) and with Tinuvin 292 in the amount of 1.9% (S21) were prepared using the same process as the coating compositions in Example 4 and were also tested.

A "dirt" slurry was prepared by combining and mixing 50 grams red iron oxide, 40 grams yellow oxide pigment, and 10 gram black iron oxide pigment until homogenous. Then 0.5 grams TAMOL 731 (Dow Chemical) was added to 200 grams deionized water with agitation. The pigment combination was then slowly added and mixed for 30 minutes until a smooth slurry was formed.

The slurry was applied to half of the coated panels using a foam applicator or other suitable brush, and dried on panels at room temperature for 3-4 hours. The dried slurry was then washed by running the panel under water and using a small piece of cheese cloth using slight rubbing. A clean cloth was used for each panel. The panels were blotted dry and allowed to completely dry (2-4 hours) before measuring the lightness (L), difference in red and green (a), and difference in yellow and blue (b) values of an unstained/unwashed portion and a stained/washed portion of the sample using a spectrophotometer (Datacolor Check II Plus). The total color difference was then calculated using the following formula: $\Delta E=(\Delta L^2+\Delta a^2+\Delta b^2)^{0.5}$. The $\Delta E$ value of Sample 10 was then subtracted from the $\Delta E$ values for each Samples S11-S16 and S19-S21. The dirt pick-up resistance measurements are shown in Table 5.

TABLE 5

Dirt Pick-Up Resistance Measurements.

| Sample | $\Delta E$ |
|---|---|
| (S10) None | 27.86 |
| (S11) MBB | 1.09 |
| (S12) BP-OH1 | 29.1 |
| (S13) BP-OH2 | 26.77 |
| (S14) BP-OH3 | 31.92 |
| (S15) BP-OH4 | 25.89 |
| (S16) BP-OH5 | 23.27 |
| (S19) 4MBP | 1.37 |

TABLE 5-continued

Dirt Pick-Up Resistance Measurements.

| Sample | ΔE |
|---|---|
| (S20) BDK | 1.13 |
| (S21) BDK + HALS | 1.08 |

The coating compositions samples having MBB (S11), 4MBP (S19) and BDK (S20) showed improved dirt pick-up resistance compared to the control (510) while the hydroxylated benzophenone derivative samples (S12-S15) did not show any improvement. Also, the coating composition samples of S20 having BDK and S21 having BDK and HALS did not have much of a difference, indicating that the presence of HALS does not impact dirt-pickup resistance.

Example 6—Thermally-Stable Coalescent Blend Composition

A thermally-stable coalescent blend composition can be prepared by heating the coalescent, preferably a low-VOC coalescent, to a temperature above the melting point of the UV-VIS absorber, typically at a temperature of about 60° C. to about 100° C., such that when the UV-VIS absorber is combined with the coalescent, the UV-VIS absorber melts and dissolves into the coalescent to form a blend. The temperature of the blend can be reduced to at least ambient temperature. The hindered amine light stabilizers can be combined with the UV-VIS absorber and the coalescent at the raised temperature or after the blend is formed. The inventors have surprisingly found that a blend of the UV-VIS absorber, the hindered amine light stabilizers, and the coalescent results in a solution that is stable at lower temperatures and during thermal cycling. In addition to the improvements in thermal stability, a synergy exists between the UV-VIS absorber and hindered amine light stabilizers when used in combination in finished paint formulation, which results in improved performance related to gloss retention without any reduction in dirt pick-up resistance performance, compared to an equivalent amount, relative to the combined amount, of each of the one or more UV-VIS absorbers and the one or more hindered amine light stabilizers when used individually in a comparable finished paint formulation.

The samples in Table 6 were prepared by combining a low-VOC coalescent (EPS™ 9147), with a UV-VIS absorber (MBB) and a hindered amine light stabilizers (Tinuvin 292) at a temperature of about 60° C. at which the MBB melted and dissolved into solution upon stirring. After the low-VOC coalescent, UV-VIS absorber and HALS were blended together into a solution, the temperature was reduced to room temperature to form the sample compositions. 100 grams of each sample were provided in clear glass jars and placed in a freezer at −20° C. for about 30 days. The samples were considered failures if large crystals/precipitate formed amounting to more than 1 wt-% of the UV-VIS absorber.

TABLE 6

Thermal Stability of Blend Compositions.

| Sample ID | Low VOC Coalescent % EPS 9147 | UV Absorber % MBB | HALS % Tinuvin 292 | Freezer Pass/Fail |
|---|---|---|---|---|
| Sample 22 | 90.00 | 2.55 | 7.45 | Pass |
| Sample 23 | 80.00 | 5.10 | 14.90 | Pass |

TABLE 6-continued

Thermal Stability of Blend Compositions.

| Sample ID | Low VOC Coalescent % EPS 9147 | UV Absorber % MBB | HALS % Tinuvin 292 | Freezer Pass/Fail |
|---|---|---|---|---|
| Sample 24 | 25.00 | 19.12 | 55.88 | Pass |
| Sample 25 | 50.00 | 12.75 | 37.25 | Pass |
| Sample 26 | 75.00 | 12.50 | 12.50 | Pass |
| Sample 27 | 50.00 | 20.00 | 30.00 | Pass |
| Sample 28 | 50.00 | 25.00 | 25.00 | Pass |
| Sample 29 | 0.00 | 0.00 | 100.00 | Pass |
| Comparative Sample 30 | 70.00 | 30.00 | 0.00 | Fail |
| Comparative Sample 31 | 48.00 | 18.00 | 34.00 | Fail |
| Comparative Sample 32 | 40.15 | 15.25 | 44.60 | Fail |
| Comparative Sample 33 | 70.00 | 30.00 | 0.00 | Fail |
| Comparative Sample 34 | 25.00 | 30.00 | 45.00 | Fail |
| Comparative Sample 35 | 25.00 | 37.50 | 37.50 | Fail |
| Comparative Sample 36 | 70.00 | 30.00 | 0.00 | Fail |
| Comparative Sample 37 | 0.00 | 100.00 | 0.00 | Fail |

Figure 2:
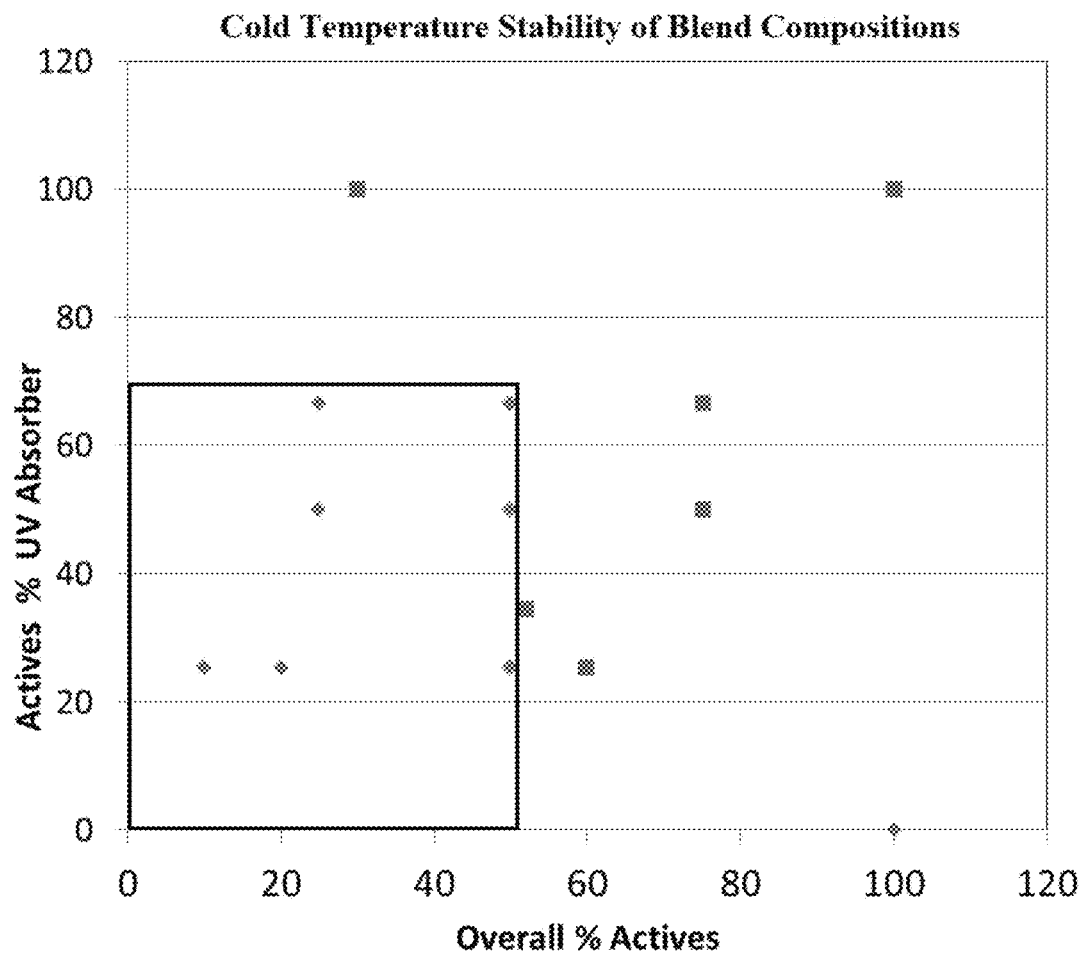
FIG. 2 is a graph illustrating the thermal stability of blend compositions according to certain embodiments of the present invention.

The stability data of Table 6 is graphed in FIG. 2. From the stability data in Table 6 as shown in FIG. 2, it can be seen that a composition range of less than about 50% overall actives (sum of UV-VIS absorber and HALS) in a low-VOC coalescent and in which no more than about 70% of the actives is the UV-VIS absorber provides a thermally-stable coalescent blend composition.

Representative Embodiments

In an embodiment, an aqueous coating composition comprises a polymer comprising a latex or water-dispersible polymer; one or more UV-VIS absorbers, wherein the one or more UV-VIS absorbers comprises a substituted benzophenone capable of being a free radical generator; one or more hindered amine light stabilizers; and optionally one or more low-VOC coalescents; wherein the one or more UV-VIS absorbers and the one or more hindered amine light stabilizers are present in the coating composition in a total combined weight of at least 0.5 wt-% based upon the total resin solids in the coating composition.

In an embodiment, a thermally-stable coalescent blend composition, comprises one or more UV-VIS absorbers, wherein the one or more UV-VIS absorbers comprises a substituted benzophenone capable of being a free radical generator; one or more hindered amine light stabilizers; and one or more low-VOC coalescents; wherein the one or more UV-VIS absorbers and the one or more hindered amine light stabilizers comprise less than about 50 wt-% of the thermally-stable coalescent blend composition; and wherein the one or more UV-VIS absorbers and the one or more hindered amine light stabilizers are present in a weight ratio of about 1:9 to about 7:3 (UV-VIS absorbers:hindered amine light stabilizers).

In an embodiment, a method of preparing a thermally-stable coalescent blend composition comprises combining one or more UV-VIS absorbers comprising a substituted benzophenone capable of being a free radical generator, one or more hindered amine light stabilizers, and one or more low VOC coalescents, to form a blend, wherein the blend is formed at a temperature of about 60° C. to about 100° C.; and reducing the temperature of the blend to at least ambient temperature; and wherein the one or more UV-VIS absorbers and the one or more hindered amine light stabilizers are present in a weight ratio of about 1:9 to about 7:3 (UV-VIS absorbers:hindered amine light stabilizers).

In an embodiment, a method of preparing an aqueous coating composition comprises providing a polymer comprising a latex or water-dispersible polymer; providing one or more UV-VIS absorbers, wherein the one or more UV-VIS absorbers comprises a substituted benzophenone that is capable of being a free radical generator; providing one or more hindered amine light stabilizers; optionally providing one or more low-VOC coalescents; and combining the polymer, the one or more UV-VIS absorbers, the one or more hindered amine light stabilizers, and optionally the low-VOC coalescent; wherein the one or more UV-VIS absorbers and the one or more hindered amine light stabilizers are present in the coating composition in a total combined weight of at least 0.5 wt-% based upon the total resin solids of the coating composition.

In an embodiment, a method of preparing an aqueous coating composition comprisesproviding a polymer comprising a latex or water-dispersible polymer; providing a thermally-stable coalescent blend composition comprising one or more UV-VIS absorbers comprising a substituted benzophenone capable of being a free radical generator, one or more hindered amine light stabilizers, and one or more low VOC coalescents, and wherein the one or more UV-VIS absorbers and the one or more hindered amine light stabilizers are present in a weight ratio of about 1:9 to about 7:3 (UV-VIS absorbers:hindered amine light stabilizers); and combining the polymer with the thermally-stable coalescent.

In an embodiment, a method for forming a coated article having a coating that exhibits improved gloss retention comprises providing a substrate; applying an aqueous coating composition on the substrate, the aqueous coating composition comprising a polymer comprising a latex or water-dispersible polymer, one or more UV-VIS absorbers comprising a substituted benzophenone capable of being a free radical generator, one or more hindered amine light stabilizers, and optionally one or more low-VOC coalescents, wherein the one or more UV-VIS absorbers and the one or more hindered amine light stabilizers are present in the coating composition in a total combined weight of at least 0.5 wt-% based upon the total resin solids in the coating composition, and allowing the coating composition to dry to a dried film; wherein the dried film has at least 80% gloss retention after at least 2000 hours measured by QUVA gloss retention at 60-degree gloss according to ASTM G154 using Cycle 1.

In an embodiment, a coated article comprises a substrate; a dried film formed from an aqueous coating composition applied to the substrate, the aqueous coating composition comprising a polymer comprising a latex or water-dispersible polymer, one or more UV-VIS absorbers comprising a substituted benzophenone capable of being a free radical initiator, one or more hindered amine light stabilizers, and optionally one or more low-VOC coalescents, wherein the one or more UV-VIS absorbers and the one or more hindered amine light stabilizers are present in the aqueous coating composition in a total combined weight of at least 1 wt-% based upon the total resin solids in the coating composition; wherein the dried film has at least 80% gloss retention after at least 2000 hours measured by QUVA gloss retention at 60-degree gloss according to ASTM G154 using Cycle 1.

The coating composition, the method, or the coated article of any preceding embodiment, wherein the coating composition includes less than about 50 g/L of volatile organic compounds (VOC)

The coating composition, the method, or the coated article of any preceding embodiment, wherein the latex polymer comprises a single stage latex polymer.

The coating composition, the method, or the coated article of any preceding embodiment, wherein the polymer is formed from at least two ethylenically unsaturated monomers comprising acrylic acid, $C_1$-$C_8$ esters of acrylic acid, substituted $C_1$-$C_8$ esters of acrylic acid, methacrylic acid, $C_1$-$C_8$ esters of methacrylic acid, substituted $C_1$-$C_8$ esters of methacrylic acid, styrene, α-methyl styrene, vinyl toluene, vinyl acetate, vinyl propionate, allyl methacrylate, or combination thereof.

The coating composition, the method, or the coated article of any preceding embodiment, wherein the polymer comprises a multistage latex polymer having a first stage with a Tg of about 0 to about 120° C. (more preferably about 25 to about 80° C. and even more preferably about 45 to 75° C.) and a second stage with a Tg of about −35 to about 10° C. (more preferably about −20 to about °5 C. and even more preferably about −15° C. to about 3° C.); and the coating composition optionally includes, up to about 0.5 wt % fluorosurfactant, the Tg values calculated by the Fox Equation.

The coating composition, the method, or the coated article of any preceding embodiment, wherein the latex comprises a multistage latex polymer having a first stage with a Tg that differs from a second stage with a Tg by at least about 35° C. (e.g., a ΔTg of at least about 35° C. to less than about 115° C., or at least about 45° C. to less than about 80° C., or at least about 50° C. to less than about 65° C.), the Tg values calculated by the Fox Equation.

The coating composition, the method, or the coated article of any preceding embodiment, wherein the polymer comprises a multistage latex polymer made from monomers including two or more, three or more, four or more of, or all of: methyl methacrylate, butyl acrylate, methacrylic acid, a ureido-functional monomer, and a crosslinking monomer selected from diacetone acrylamide or 2-(acetoacetoxy)ethyl methacrylate.

The coating composition, the method, or the coated article of any preceding embodiment, wherein the monomers used to make the multistage latex polymer include both methyl methacrylate and butyl acrylate, and wherein the combined weight of methyl methacrylate and butyl acrylate comprises at least 50 weight percent (more preferably at least 60 weight percent, even more preferably at least 70 weight percent, and even more preferably at least 80 weight percent, and optionally at least 90 weight percent) of the multistage latex, based on the total weight of the monomers used to make the multistage latex polymer.

The coating composition, the method, or the coated article of any preceding embodiment, wherein the monomers used to make the multistage latex polymer include one or more of diacetone acrylamide or 2-(acetoacetoxy)ethyl methacrylate in an amount of about 0.5 to about 6 weight percent, based on the total weight of the monomers used to make the multistage latex polymer.

The coating composition, the method, or the coated article of any preceding embodiment, wherein the polymer comprises a multistage latex polymer prepared from a first stage of monomers having a first Tg value calculated by the Fox Equation and a second stage of monomers having a second Tg value calculated by the Fox Equation, the first Tg value being greater than the second Tg value, and a ratio of the first stage of monomers to the second stage of monomers (first stage of monomers:second stage of monomers) being between about 1:9 to about 1:1, more preferably about 1:4 to about 2:3, even more preferably about 1:3 to about 1:2.

The coating composition, the method, or the coated article of any preceding embodiment, wherein the polymer comprises a multistage latex polymer made from a first mixture of monomers for a first stage, the first mixture comprising methyl methacrylate, butyl acrylate, methacrylic acid, a ureido-functional monomer, and optionally diacetone acrylamide; and a second mixture of monomers for a second stage, the second mixture comprising methyl methacrylate, butyl acrylate, an acid-functional ethylenically unsaturated monomer (e.g., methacrylic acid), optionally diacetone acrylamide, and a ureido-functional monomer; wherein either the first stage or the second stage can occur first.

The coating composition, the method, or the coated article of any preceding embodiment, wherein the polymer comprises a latex polymer having at least one Tg within a range of −20° C. to 70° C., the Tg value(s) calculated by the Fox Equation.

The coating composition, the method, or the coated article of any preceding embodiment, wherein the polymer comprises a latex polymer having at least one Tg within a range of −15° C. to 60° C., the Tg value(s) calculated by the Fox Equation.

The coating composition, method, or the coated article of any preceding embodiment, wherein the polymer comprises a latex polymer having at least one Tg within a range of −10° C. to 30° C., the Tg value(s) calculated by the Fox Equation.

The coating composition, the method, or the coated article of any preceding embodiment, wherein the latex polymer comprises the polymerization product of ethylenically unsaturated monomers selected from one or more of alkyl acrylates, alkoxy acrylates, alkyl methacrylates, alkoxy methacrylates, vinyl esters of saturated carboxylic acids, monoolefins, and conjugated dienes optionally with one or more monomers selected one or more of styrene, methyl methacrylate, butyl acrylate, 2-ethylhexyl acrylate, vinyl acetate, acrylonitrile, and vinyl chloride.

The coating composition, the method, or the coated article of any preceding embodiment, wherein the latex polymer is formed from ingredients including a polymeric surfactant, non-polymeric surfactant, or combinations thereof, and at least one of an acrylate or a methacrylate.

The coating composition, the thermally-stable coalescent blend composition, the method, or the coated article of any preceding embodiment, wherein the substituted benzophenone comprises a substituent group attached to a carbon atom of one or more of the phenyl rings that is greater than 17 daltons, more preferably greater than 30 daltons, and most preferably includes at least one carbon atom and optionally one or more heteroatoms such as O, N, S, and P.

The coating composition, the thermally-stable coalescent blend composition, the method, or the coated article of any preceding embodiment, wherein the substituted benzophenone comprises a substituent group attached to a carbon atom at an ortho position on at least one of the phenyl rings that is greater than 17 daltons, more preferably greater than 30 daltons, and most preferably includes at least one carbon atom and optionally one or more heteroatoms such as O, N, S and P.

The coating composition, the thermally-stable coalescent blend composition, the method, or the coated article of any preceding embodiment, wherein the substituted benzophenone comprises a substituent group attached at a carbon atom at a meta or para position on at least one of the phenyl rings that includes at least one carbon atom and optionally one or more heteroatoms such as O, N, S and P.

The coating composition, the thermally-stable coalescent blend composition, the method, or the coated article of any preceding embodiment, wherein the substituted benzophenone comprises at least one substituent group replacing a phenyl ring, wherein the substituent group is greater than 17 daltons, more preferably greater than 30 daltons, and most preferably includes at least one at least one carbon atom and optionally one or more a atoms such as O, N, S and P.

The coating composition, the thermally-stable coalescent blend composition, the method, or the coated article of any preceding embodiment, wherein the substituted benzophenone comprises at least one bridge substitution that is greater than 17 daltons including the backbone bridge heteroatom, more preferably greater than 30 daltons including the backbone bridge heteroatom, and most preferably includes at least one carbon atom and optionally one or morel atoms such as O, N, S and P.

The coating composition, the thermally-stable coalescent blend composition, the method, or the coated article of any preceding embodiment, wherein the substituted benzophenone comprises at least a nitrogen atom replacing the oxygen atom of the bridge ketone, most preferably comprising a hydrazine in the bridge backbone.

The coating composition, the thermally-stable coalescent blend composition, the method, or the coated article of any preceding embodiment, wherein the substituted benzophenone comprises Formula (I):

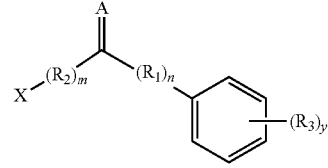

(Formula I)

wherein A is an oxygen atom or N—NH$_2$, or optionally any other suitable atom or group;

wherein n is 0 or 1, m is 0 or 1, and y is 0 to 5, with the proviso that n, m and y are each preferably 0 when A is N—NH$_2$;

wherein R$_1$ and R$_2$, if present, independently from each other comprise an organic linking group, more preferably an organic linking group, even more preferably an organic linking group selected from CH$_3$—O—B—O—CH$_3$ and CH$_3$—CH$_2$—B—N—(CH$_3$)$_2$, wherein B is a backbone bridge carbon heteroatom;

wherein R$_3$ comprises an organic substituent group, more preferably an alkanoyloxy group, C$_1$-C$_3$ alkyl, diethylaminogroup, or a 6-membered nitrogen and oxygen-containing saturated heterocyclic group

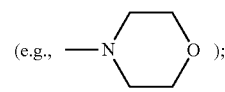

(e.g.,         );

and wherein X is preferably a phenyl group, hydroxy-2-methyl-propyl group, an alkanoyloxy group, a phosphine oxide group, or any other suitable group (typically an organic group), with the proviso that when X comprises a phenyl group then the total of m, n and y is ≥1.

The coating composition, the thermally-stable coalescent blend composition, the method, or the coated article of any preceding embodiment, wherein the substituted benzophenone comprises Formula (II):

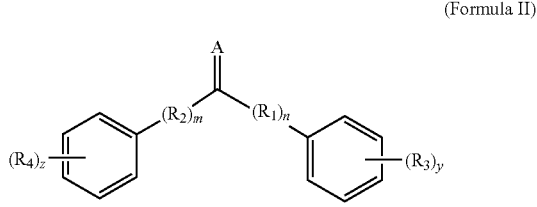

(Formula II)

wherein A is preferably an oxygen atom or N—NH$_2$, or optionally any other suitable atom or group;

wherein n is 0 or 1, m is 0 or 1, y is 0 to 5, and z is 0 to 5, with the proviso that n, m, y and z are preferably each 0 when A is N—NH$_2$ and with the further proviso that the total of n, m, y and z is ≥1 when A is an oxygen atom;

wherein $R_1$ and $R_2$, if present, independently from each other comprise an organic linking group, more preferably an organic linking group selected from CH$_3$—O—B—O—CH$_3$ and CH$_3$—CH$_2$—B—N—(CH$_3$)$_2$, wherein B is a backbone bridge carbon heteroatom;

wherein $R_3$, and $R_4$, if present, independently from each other may comprise an organic substituent group, more preferably an alkanoyloxy group, C$_1$-C$_3$ alkyl, diethylaminogroup, a 6-membered nitrogen and oxygen-containing saturated heterocyclic group (e.g., 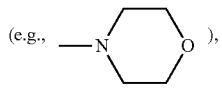 ), or form a bridge comprising a S atom.

The coating composition, the thermally-stable coalescent blend composition, the method, or the coated article of any preceding embodiment, wherein the one or more UV-VIS absorbers comprises phenylbis(2,4,6-trimethylbenzoyl) phosphine oxide, ethyl-2,4,6-trimethylbenzoylphenylphosphinate, 2,4,6-trimethylbenzophenone, 4-methylbenzophenone, 4-phenylbenzophenone, 2,2-dimethoxy-1,2-diphenylethanone, 1-hydroxycyclohexyl phenyl ketone, 2-hydroxy-2-methyl-1-phenyl-1-propanone, isopropylthioxanthone, methyl-o-benzoyl-benzoate, methylbenzoylformate, benzoin ethyl ether, 4'-ethoxyacetophenone, 4,4-bis(diethylamino)benzophenone, 2,2-dimethoxy-2-phenylacetephenone, 2-hydroxy-2-methylpropiophenone, 2-benzyl-2-(diemthylamino)-4'-morpholinobutryophenone, 4-methylbenzophenone, benzophenone hydrazone, or a combination thereof.

The coating composition, the thermally-stable coalescent blend composition, the method, or the coated article of any preceding embodiment, wherein the one or more water-insoluble UV-VIS absorbers is methyl-o-benzoyl-benzoate.

The coating composition, the thermally-stable coalescent blend composition, the method, or the coated article of any preceding embodiment, wherein the one or more UV-VIS absorbers is 2,2-dimethoxy-2-phenylacetephenone.

The coating composition, the thermally-stable coalescent blend composition, the method, or the coated article of any preceding embodiment, wherein the coating composition is substantially free of benzophenone.

The coating composition, the thermally-stable coalescent blend composition, the method, or the coated article of any preceding embodiment, wherein the one or more one or more UV-VIS absorbers elute from a GC column at the same time or after the methyl palmitate under the same conditions according to ASTM D6886-12.

The coating composition, the thermally-stable coalescent blend composition, the method, or the coated article of any preceding embodiment, wherein the coating composition is substantially free of a hydroxylated benzophenone.

The coating composition, the thermally-stable coalescent blend composition, the method, or the coated article of any preceding embodiment, wherein the one or more UV-VIS absorbers is water-insoluble.

The coating composition, the thermally-stable coalescent blend composition, the method, or the coated article of any preceding embodiment, wherein the one or more UV-VIS absorbers is capable of absorbing radiation within a range of 240-465 nm, most the one or more UV-VIS absorbers being a UV absorber capable of absorbing radiation within a range of 240-440 nm.

The coating composition, the thermally-stable coalescent blend composition, the method, or the coated article of any preceding embodiment, wherein the one or more hindered amine light stabilizers comprises a tetramethylpiperidine derivative.

The coating composition, the thermally-stable coalescent blend composition, the method, or the coated article of any preceding embodiment, wherein the one or more hindered amine light stabilizers comprising bis(1,2,2,6,6-pentamethyl-4-piperidyl) sebacate, methyl 1,2,2,6,6-pentamethyl-4-piperidyl sebacate, or mixture thereof.

The coating composition, the thermally-stable coalescent blend composition, the method, or the coated article of any preceding embodiment, wherein the one or more hindered amine light stabilizers is a liquid.

The coating composition, the thermally-stable coalescent blend composition, the method, or the coated article of any preceding embodiment, wherein the one or more low-VOC coalescents are used in an amount that facilitates dissolving the one or more UV-VIS absorbers and the one or more hindered amine light stabilizers into a solution.

The coating composition, the thermally-stable coalescent blend composition, the method, or the coated article of any preceding embodiment, wherein the one or more low-VOC coalescents have a volatile organic content of 20 wt-% or less.

The coating composition, the thermally-stable coalescent blend composition, the method, or the coated article of any preceding embodiment, wherein the one or more low-VOC coalescents have a volatile organic content of 15 wt-% or less.

The coating composition, the thermally-stable coalescent blend composition, the method, or the coated article of any preceding embodiment, wherein the one or more low-VOC coalescents are nonreactive with the aqueous polymer.

The coating composition, the thermally-stable coalescent blend composition, the method, or the coated article of any preceding embodiment, wherein the one or more low-VOC coalescents have the formula:

$$R^1—(C(O)—X_r—O)_n—R^2$$

wherein:
$R^1$ is an organic group;
X is a divalent organic group;

r is 0 or 1;

n is 1 to 10; and $R^2$ is hydrogen or an organic group;

with the proviso that $R^1$ includes at least three carbon atoms when X is not —$(CH_2)_s$— wherein s is 2 to 8;

with the proviso that the one or more low-VOC coalescents have less than two aliphatic unsaturated carbon-carbon bonds when r is zero.

The coating composition, the thermally-stable coalescent blend composition, the method, or the coated article of any preceding embodiment, wherein the one or more low-VOC coalescents comprises bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, or oleic acid monoester of propylene glycol.

The coating composition, the thermally-stable coalescent blend composition, the method, or the coated article of any preceding embodiment, wherein the one or more low-VOC coalescents having a volatile organic content of 30% or less according to ASTM D2369-90, or that elute from a GC column at the same time or after the methyl palmitate under the same conditions according to ASTM D6886-12.

The coating composition, the method, or the coated article of any preceding embodiment, wherein the coating composition is a paint, a pigmented or unpigmented sealer, or a sealant.

The thermally-stable coalescent blend composition, the method, or the coated article of any preceding embodiment, wherein less than 1 wt-% of the UV-VIS absorber, if any, precipitates out of the thermally-stable coalescent blend composition when stored for at least 30 days at ambient conditions.

The thermally-stable coalescent blend composition, the method, or the coated article of any preceding embodiment, wherein less than 1 wt-% of the UV-VIS absorber, if any, precipitates out of the thermally-stable coalescent blend composition when stored for at least 30 days at −20° C.

The thermally-stable coalescent blend composition, the method, or the coated article of any preceding embodiment, wherein there is no visible precipitate of UV-VIS absorber in the thermally-stable coalescent blend composition to an unaided eye upon when stored for at least 30 days at −20° C.

The coating composition, the thermally-stable coalescent blend composition, the method, or the coated article of any preceding embodiment, wherein the one or more UV-VIS absorbers and the one or more hindered amine light stabilizers have a greater effect on gloss retention when used in combination than an equivalent amount, relative to the combined amount, of each of the one or more UV-VIS absorbers and the one or more hindered amine light stabilizers when used individually in comparable aqueous coating compositions.

The coating composition, the method, or the coated article of any preceding embodiment, wherein the coating composition is in the form of a paint having one or more pigments, fillers, thickeners, biocides, mildewcides, surfactants, dispersants, and defoamers.

The coating composition, the method, or the coated article of any preceding embodiment, wherein the aqueous polymer is formed by polymerization before adding the one or more UV-VIS absorbers, the one or more hindered amine light stabilizers, or the optionally one or more low-VOC coalescents.

The coating composition, the method, or the coated article of any preceding embodiment, wherein the one or more UV-VIS absorbers are present in the coating composition in amount of at least 0.2 wt-% based upon the total resin solids.

The coating composition, the method, or the coated article of any preceding embodiment, wherein the one or more UV-VIS absorbers are present in the coating composition in amount of at least 0.3 wt-% based upon the total resin solids.

The coating composition, the method, or the coated article of any preceding embodiment, wherein the one or more UV-VIS absorbers are present in the coating composition in amount of at least 0.65 wt-% based upon the total resin solids.

The coating composition, the method, or the coated article of any preceding embodiment, wherein the one or more UV-VIS absorbers is present in the coating composition in amount of at least 0.95 wt-% based upon the total resin solids.

The coating composition, the method, or the coated article of any preceding embodiment, wherein the one or more hindered amine light stabilizers are present in the coating composition in an amount of at least 0.5 wt-% based upon the total resin solids.

The coating composition, the method, or the coated article of any preceding embodiment, wherein the one or more hindered amine light stabilizers are present in the coating composition in an amount of at least 1.5 wt-% based upon the total resin solids.

The coating composition, the method, or the coated article of any preceding embodiment, wherein the one or more hindered amine light stabilizers are present in the coating composition in an amount of at least 1.9 wt-% based upon the total resin solids.

The coating composition, the thermally-stable coalescent blend composition, the method, or the coated article of any preceding embodiment, wherein the one or more UV-VIS absorbers and the one or more hindered amine light stabilizers are present in a ratio of about 1:3 to about 7:3 (UV-VIS absorbers:hindered amine light stabilizers).

The coating composition, the thermally-stable coalescent blend composition, the method, or the coated article of any preceding embodiment, wherein the one or more UV-VIS absorbers and the one or more hindered amine light stabilizers comprise less than about 50 wt-% of the thermally-stable coalescent blend composition.

The coating composition, the thermally-stable coalescent blend composition, the method, or the coated article of any preceding embodiment, wherein a dried film of the coating composition applied to a substrate has a gloss retention of at least 85% over 2000 hours measured at 60-degree gloss according to ASTM G154 using Cycle 1.

The coating composition, the thermally-stable coalescent blend composition, the method, or the coated article of any preceding embodiment, wherein a dried film of the coating composition has an initial minimum gloss rating of at least 20 (satin-like), at least 35 (traditional semi-gloss), at least 70 (traditional gloss/high gloss architectural), at least 85 (high gloss) units with a 60-degree gloss meter, and the dried film has a gloss retention of at least 90% over 2000 hours as measured at 60-degree gloss according to ASTM G154 using Cycle 1.

The coating composition, the thermally-stable coalescent blend composition, the method, or the coated article of any preceding embodiment, wherein a dried film of the coating composition applied to a substrate has a gloss retention of less than a 10 unit drop over 2000 hours measured at 60-degree gloss according to ASTM G154 using Cycle 1.

The coating composition, the method, or the coated article of any preceding embodiment, wherein the polymer is a self-crosslinking polymer.

The coating composition, the method, or the coated article of any preceding embodiment, wherein the coating composition comprises a self-crosslinking moiety provided by 2-(acetoacetoxy)ethyl methacrylate, diacetone acrylamide, or a mixture or combination thereof.

The coating composition, the method, or the coated article of any preceding embodiment, wherein the coating composition comprises a self-crosslinking moiety derived from one or more multifunctional monomers selected from ethylene glycol dimethacrylate, butylene glycol dimethacrylate, hexanediol diacrylate, hexane diol diacrylate, divinyl benzene, allyl methacrylate, diallyl phthalate, or a mixture or combination thereof.

The coating composition, the method, or the coated article of any preceding embodiment, wherein the coating composition includes less than 40 g/L VOC, more preferably less than 30 g/L VOC, more preferably less than 20 g/L VOC, more preferably less than 10 g/L VOC, more preferably less than 5 g/L VOC, most preferably less than 1 g/L VOC.

The coating composition, the method, or the coated article of any preceding embodiment, wherein the coating composition is a water-based paint with a pigment volume concentration of at least 40.

The coating composition, the thermally-stable coalescent blend composition, the method, or the coated article of any preceding embodiment, wherein a dried film of the coating composition applied to a substrate has a greater gloss retention measured at 60-degree gloss than an additive effect of the one or more one or more water-insoluble UV-VIS absorbers and the one or more hindered amine light stabilizers, the additive effect determined from a first coating composition being the same as the coating composition without the one or more hindered amine light stabilizers and a second coating composition being the same as the coating composition without the one or more one or more UV-VIS absorbers.

The coating composition, the thermally-stable coalescent blend composition, the method, or the coated article of any preceding embodiment, wherein a dried film of the coating composition applied to a substrate has an improved dirt pick-up resistance by at least 10%, or at least 20%, or at least 30%, or at least 40%, or at least 50%, or at least 60%, or at least 70%, or at least 80%, or at least 90%, relative to the same water-based composition without the one or more UV-VIS absorbers and the one or more hindered amine light stabilizers, based on a change in ΔE values.

The coating composition, the method, or the coated article of any preceding embodiment, wherein the coating composition comprises an architectural paint.

The coating composition, the method, or the coated article of any preceding embodiment, wherein the coating composition comprises an in-store tintable architectural paint.

The coating composition, the method, or the coated article of any preceding embodiment, wherein the coating composition is provided from a base paint and a colorant composition, wherein the one or more UV-VIS absorbers, one or more hindered amine light stabilizers and optional coalescent can be provided in the coating composition by being present in the base paint, colorant composition, or an additive composition added thereto The coating composition, the method, or the coated article of any preceding embodiment, wherein the coating composition is an intermediate for further formulation to form an architectural finish paint.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant art will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An aqueous coating composition having an improved gloss retention, the coating composition comprising:
   a latex polymer comprising at least one ethylenically unsaturated monomer dispersed in an aqueous medium;
   one or more UV-VIS absorbers, wherein the one or more UV-VIS absorbers comprises a substituted benzophenone capable of being a free radical generator, wherein the substituted benzophenone is phenylbis(2,4,6-trimethylbenzoyl)phosphine oxide, ethyl-2,4,6-trimethylbenzoylphenylphosphinate, 2,4,6-trimethylbenzophenone, 4-methylbenzophenone, 4-phenylbenzophenone, 2,2-dimethoxy-1,2-diphenylethanone, 1-hydroxycyclohexyl phenyl ketone, 2-hydroxy-2-methyl-1-phenyl-1-propanone, isopropylthioxanthone, methyl-o-benzoylbenzoate, methylbenzoylformate, benzoin ethyl ether, 4'-ethoxyacetophenone, 4,4-bis(diethylamino)benzophenone, 2,2-dimethoxy-2-phenylacetephenone, 2-hydroxy-2-methylpropiophenone, 2-benzyl-2-(diemthylamino)-4'-morpholinobutryophenone, 4-methylbenzophenone, benzophenone hydrazone, or a combination thereof;
one or more hindered amine light stabilizers; and
optionally one or more low-VOC coalescents;
wherein the one or more UV-VIS absorbers and the one or more hindered amine light stabilizers are present in the coating composition in a total combined weight of at least 0.5 wt-% based upon the total polymer solids in the aqueous coating composition.

2. The coating composition of claim 1, wherein the polymer is formed from at least two ethylenically unsaturated monomers comprising acrylic acid, $C_1$-$C_8$ esters of acrylic acid, substituted $C_1$-$C_8$ esters of acrylic acid, methacrylic acid, $C_1$-$C_8$ esters of methacrylic acid, substituted $C_1$-$C_8$ esters of methacrylic acid, styrene, α-methyl styrene, vinyl toluene, vinyl acetate, vinyl propionate, allyl methacrylate, or combination thereof.

3. The coating composition of claim 1, wherein the polymer comprises a multistage latex polymer having a first stage with a Tg of about 25° C. to about 90° C. and a second stage with a Tg of about −15 to about 10° C., the Tg values calculated by the Fox Equation.

4. The coating composition of claim 1, wherein the polymer comprises a multistage latex polymer having a first stage with a Tg that differs from a second stage with a Tg by at least about 35° C., the Tg values calculated by the Fox Equation.

5. The coating composition of claim 1, wherein the polymer comprises a latex polymer having at least one Tg within a range of −20° C. to 70° C., the Tg value calculated by the Fox Equation.

6. The coating composition of claim 1, wherein the polymer comprises a latex polymer having at least one Tg within a range of −15° C. to 60° C., the Tg value calculated by the Fox Equation.

7. The coating composition of claim 1, wherein the polymer comprises a latex polymer having at least one Tg within a range of −10° C. to 30° C., the Tg value calculated by the Fox Equation.

8. The coating composition of claim 1, wherein the polymer comprises a multistage latex polymer polymerized from a first mixture of monomers for a first stage and a second mixture of monomers for a second stage, the first mixture comprising methyl methacrylate, butyl acrylate, methacrylic acid, a ureido-functional monomer, and optionally diacetone acrylamide, and the second mixture comprising methyl methacrylate, butyl acrylate, an acid-functional ethylenically unsaturated monomer, optionally diacetone acrylamide, and a ureido-functional monomer.

9. The coating composition of claim 1, wherein the polymer comprises a single stage latex polymer.

10. The coating composition of claim 1, wherein the substituted benzophenone comprises a substituent group attached to a carbon atom at an ortho position on at least one of the phenyl rings that is greater than 17 daltons and includes at least one carbon atom and optionally one or more heteroatoms chosen from O, N, S and P.

11. The coating composition of claim 1, wherein the substituted benzophenone comprises a substituent group attached at a carbon atom at a meta or para position on at least one of the phenyl rings that includes at least one carbon atom and optionally one or more heteroatoms chosen from O, N, S and P.

12. The coating composition of claim 1, wherein the substituted benzophenone comprises at least one substituent group replacing a phenyl ring, wherein the substituent group is greater than 17 daltons and includes at least one carbon atom and optionally one or more heteroatoms chosen from O, N, S and P.

13. The coating composition of claim 1, wherein the coating composition is substantially free of benzophenone.

14. The coating composition of claim 1, wherein the one or more UV-VIS absorbers is capable of absorbing radiation within a range of 240-465 nm.

15. The coating composition of claim 1, wherein the one or more hindered amine light stabilizers comprises a tetramethylpiperidine derivative.

16. The coating composition of claim 1, wherein the one or more UV-VIS absorbers and the one or more hindered amine light stabilizers are present in a ratio of about 1:3 to about 7:3 (UV-VIS absorbers:hindered amine light stabilizers).

17. The coating composition of claim 1, wherein the coating composition includes less than about 50 g/L of volatile organic compounds (VOC).

18. The coating composition of claim 1, wherein the coating composition applied to a substrate and allowed to dry as a film has at least 80% gloss retention after at least 2000 hours measured by QUVA gloss retention at 60-degree gloss according to ASTM G154, cycle 1.

19. An aqueous coating composition having an improved gloss retention, the coating composition comprising:
a latex polymer comprising at least one ethylenically unsaturated monomer dispersed in an aqueous medium;
one or more UV-VIS absorbers, wherein the one or more UV-VIS absorbers comprises a substituted benzophenone capable of being a free radical generator, wherein the substituted benzophenone comprises Formula (I):

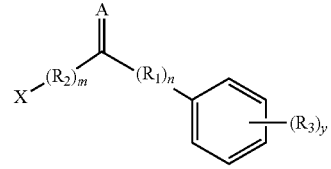

(Formula I)

wherein A is an oxygen atom or N—NH$_2$;
wherein n is 0 or 1, m is 0 or 1, and y is 0 to 5, with the proviso that n, m and y are each 0 when A is N—NH$_2$;
wherein $R_1$ and $R_2$, if present, independently from each other comprise an organic linking group;
wherein $R_3$ comprises an alkanoyloxy group, $C_1$-$C_3$ alkyl, diethylaminogroup, or a 6-membered nitrogen and oxygen-containing saturated heterocyclic group; and
wherein X is a phenyl group, hydroxy-2-methyl-propyl group, an alkanoyloxy group, or a phosphine oxide group, with the proviso that when X comprises a phenyl group then the total of m, n and y is ≥1;
one or more hindered amine light stabilizers; and
optionally one or more low-VOC coalescents;
wherein the one or more UV-VIS absorbers and the one or more hindered amine light stabilizers are present in the coating composition in a total combined weight of at least 0.5 wt-% based upon the total polymer solids in the aqueous coating composition.

20. An aqueous coating composition having an improved gloss retention, the coating composition comprising:
a latex polymer comprising at least one ethylenically unsaturated monomer dispersed in an aqueous medium;

one or more UV-VIS absorbers, wherein the one or more UV-VIS absorbers comprises a substituted benzophenone capable of being a free radical generator, wherein the substituted benzophenone comprises Formula (II):

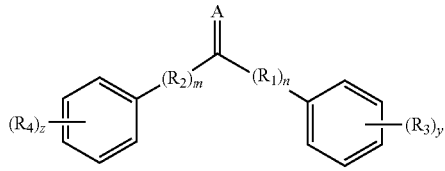

(Formula II)

wherein A is an oxygen atom or N—NH$_2$;

wherein n is 0 or 1, m is 0 or 1, y is 0 to 5, and z is 0 to 5, with the proviso that n, m, y and z are each 0 when A is N—NH$_2$ and with the further proviso that the total of n, m, y and z is ≥1 when A is an oxygen atom;

wherein R$_1$ and R$_2$, if present, independently from each other comprise an organic linking group;

wherein R$_3$, and R$_4$, if present, independently from each other an alkanoyloxy group, C$_1$-C$_3$ alkyl, diethylaminogroup, a 6-membered nitrogen and oxygen-containing saturated heterocyclic group, or form a bridge comprising an S atom;

one or more hindered amine light stabilizers; and optionally one or more low-VOC coalescents;

wherein the one or more UV-VIS absorbers and the one or more hindered amine light stabilizers are present in the coating composition in a total combined weight of at least 0.5 wt-% based upon the total polymer solids in the aqueous coating composition.

* * * * *